(12) United States Patent
Freeman

(10) Patent No.: US 7,264,617 B2
(45) Date of Patent: Sep. 4, 2007

(54) INTEGRALLY MANUFACTURED MICRO-ELECTROFLUIDIC CABLES

(75) Inventor: Alex R. Freeman, Plano, TX (US)

(73) Assignee: Alex Freeman, Plano, TX (US)

( * ) Notice: Subject to any disclaimer, the term of this patent is extended or adjusted under 35 U.S.C. 154(b) by 0 days.

(21) Appl. No.: 09/796,095

(22) Filed: Feb. 28, 2001

(65) Prior Publication Data

US 2005/0205136 A1    Sep. 22, 2005

Related U.S. Application Data

(60) Provisional application No. 60/185,856, filed on Feb. 29, 2000.

(51) Int. Cl.
*A61K 9/22* (2006.01)
(52) U.S. Cl. .................. 604/890.1; 604/891.1
(58) Field of Classification Search ............. 604/890.1, 604/891.1, 93.01, 65–67, 131, 288
See application file for complete search history.

(56) References Cited

U.S. PATENT DOCUMENTS 5,640,995 A * 6/1997 Packard et al. ............. 137/597
6,136,212 A * 10/2000 Mastrangelo et al. ......... 216/49

FOREIGN PATENT DOCUMENTS

WO    WO 01/25137    * 4/2001
WO    WO 01/25138    * 4/2001

* cited by examiner

*Primary Examiner*—Nicholas D. Lucchesi
*Assistant Examiner*—Matthew DeSanto

(57) ABSTRACT

Flexible microconduits integral at a proximal end to a substrate and adapted for connection to a biological environment at the distal end are provided. Also provided are microsystems with at least one flexible microconduit integral at a proximal end to a substrate and with a distal end that is adapted for connection to a biological environment. The microconduits may be fluid conduits, electrical conduits, or electro-fluidic conduits that transmit both fluids and electrical signals. Methods for fabricating the microconduits and other structures integral with the substrate are also provided.

36 Claims, 15 Drawing Sheets

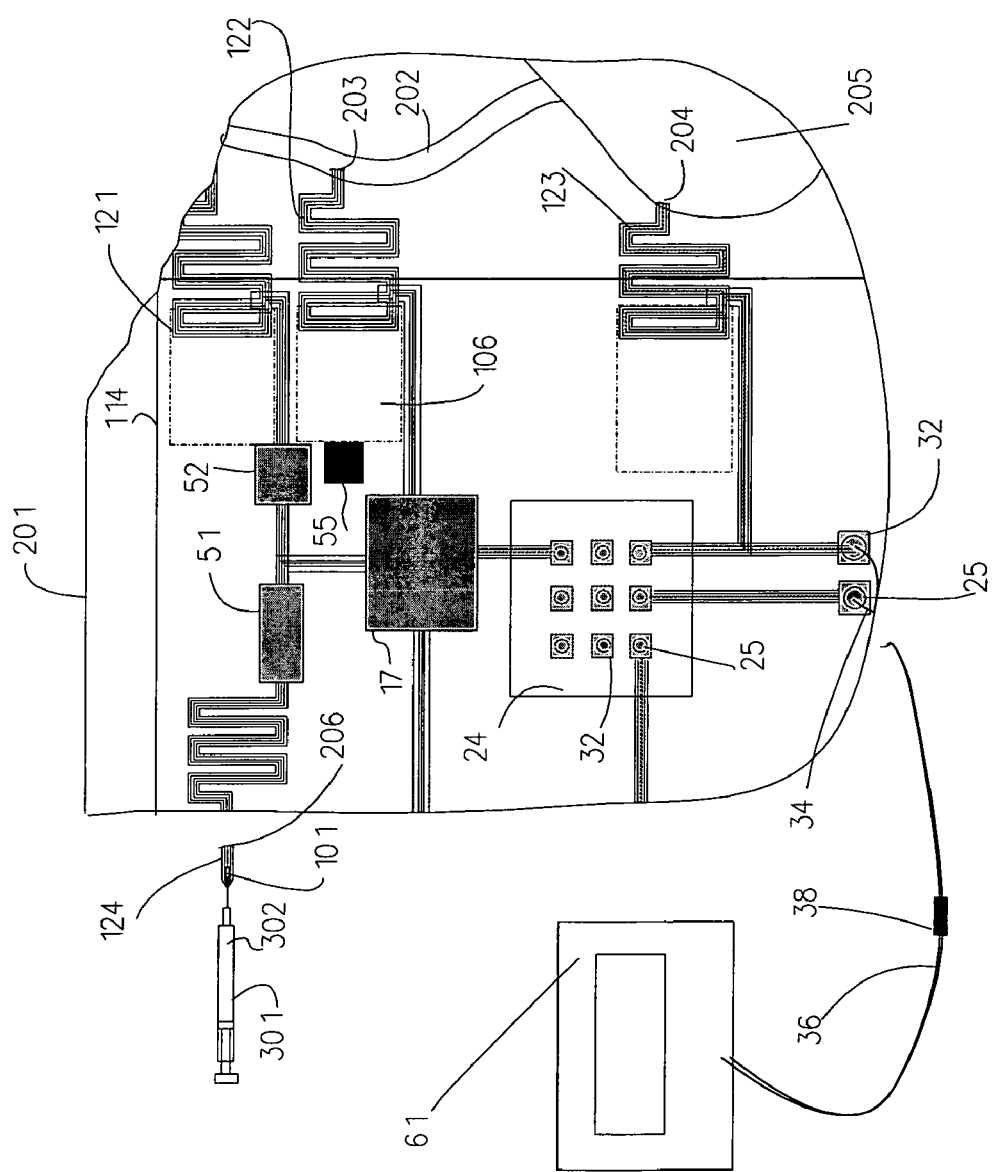

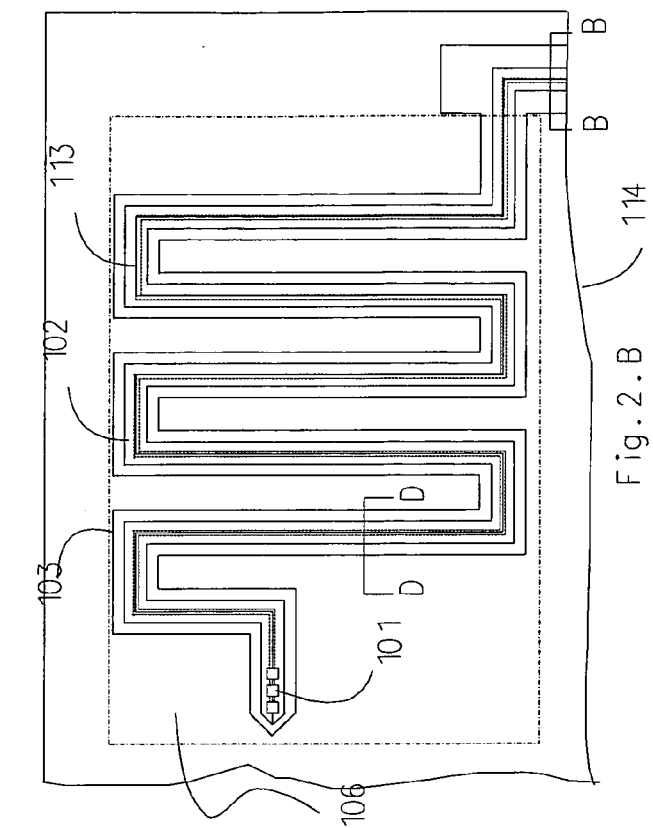
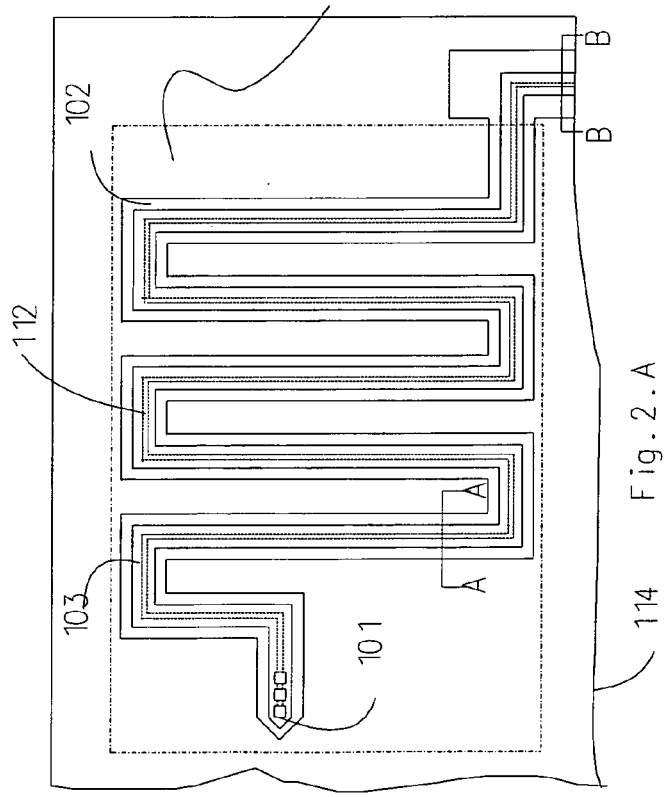

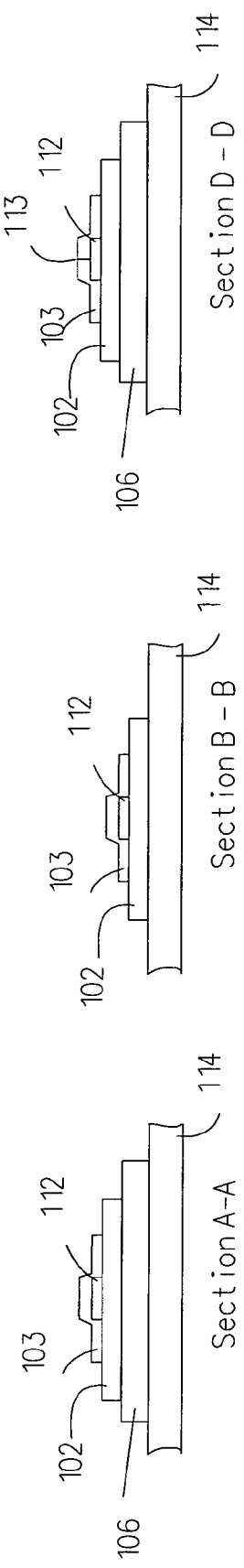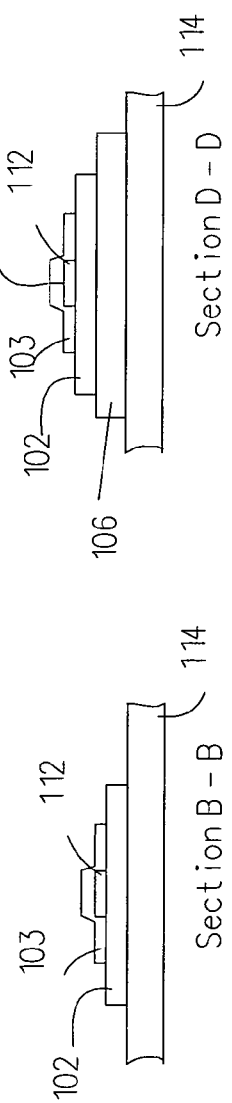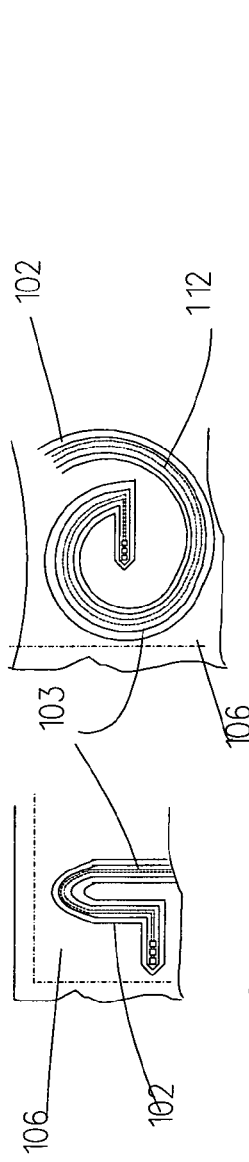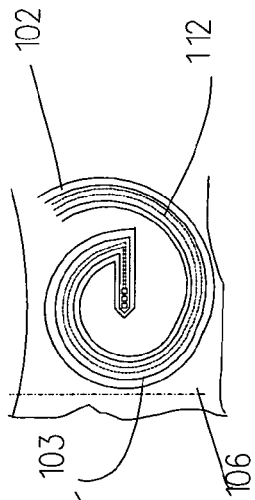

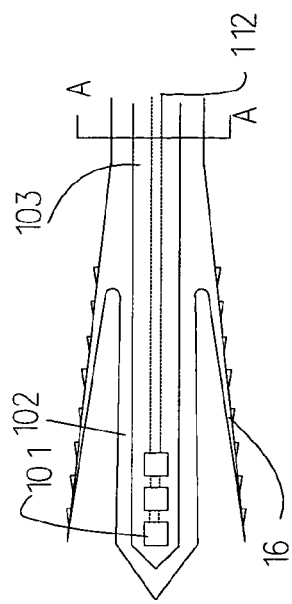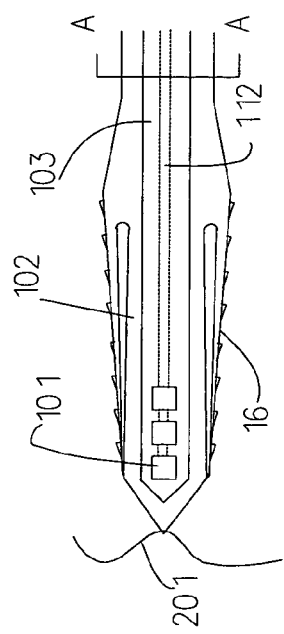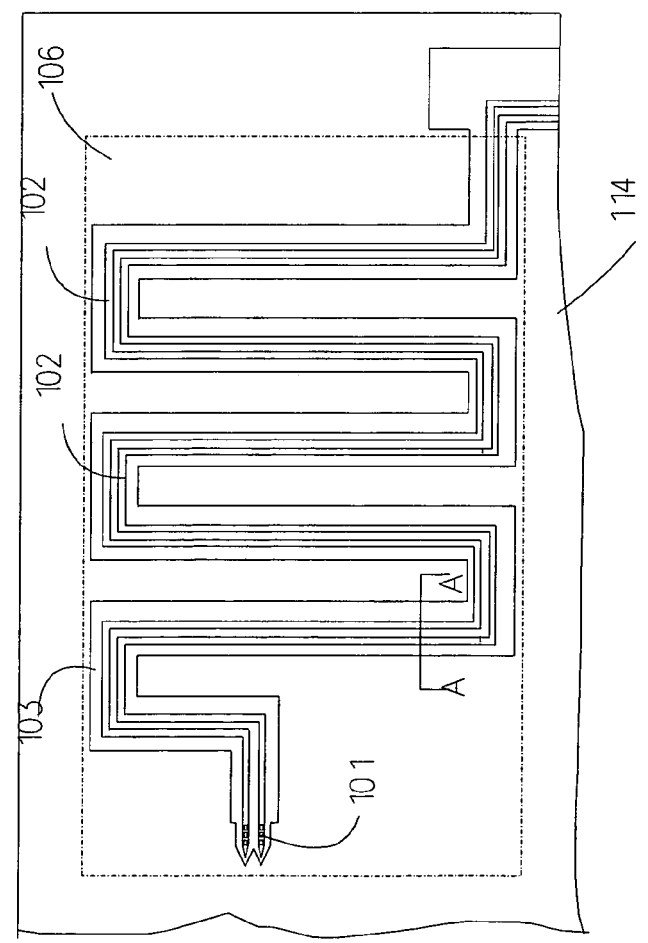
Fig. 3.A
Fig. 3.B
Fig. 3.C

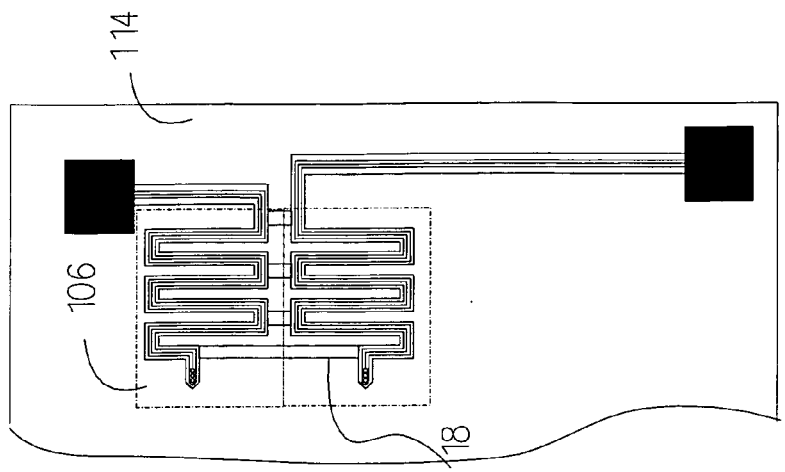
Fig. 3.G
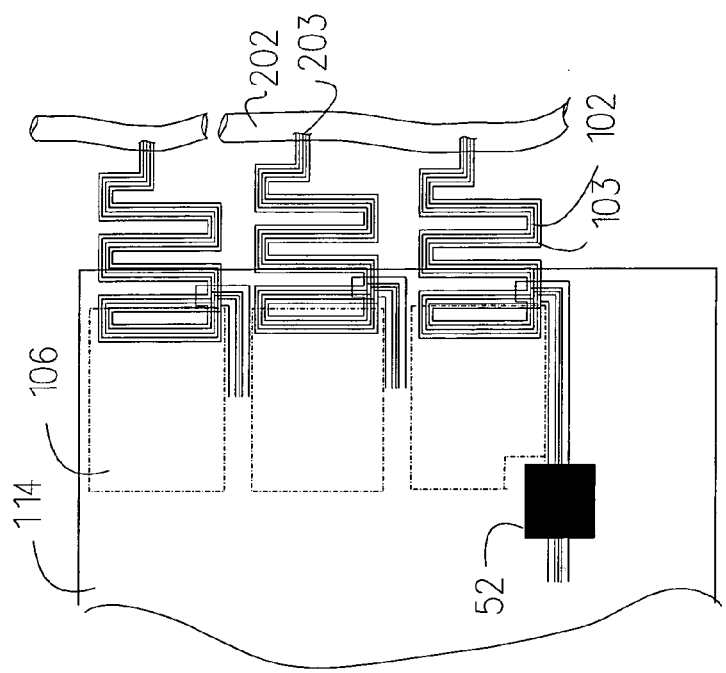
Fig. 3.F
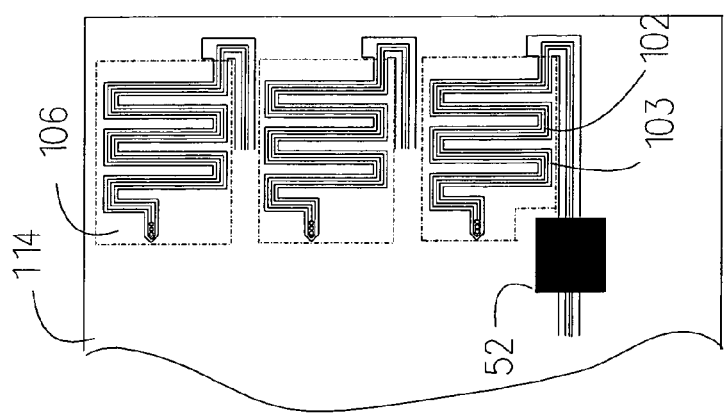
Fig. 3.E

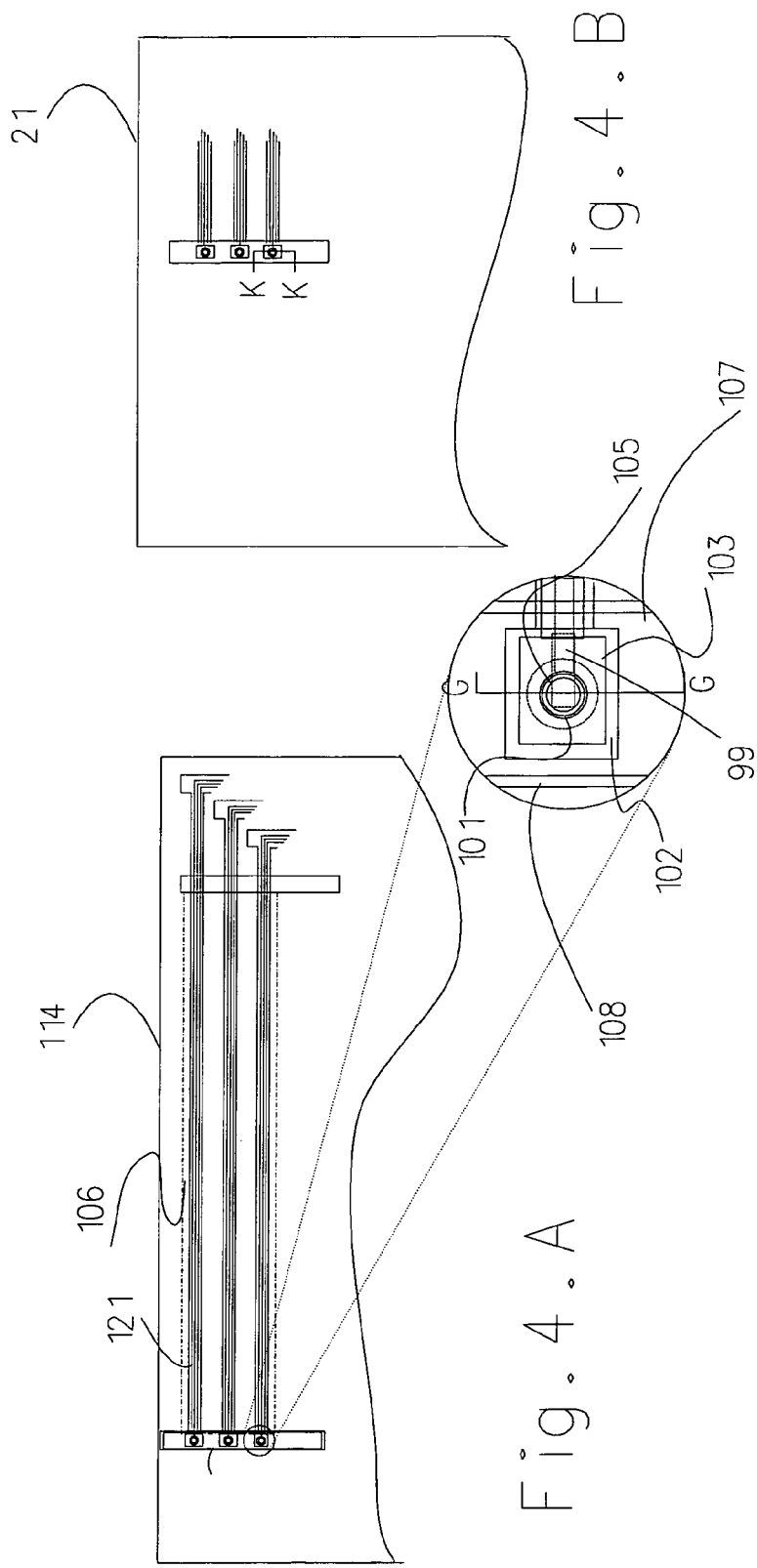

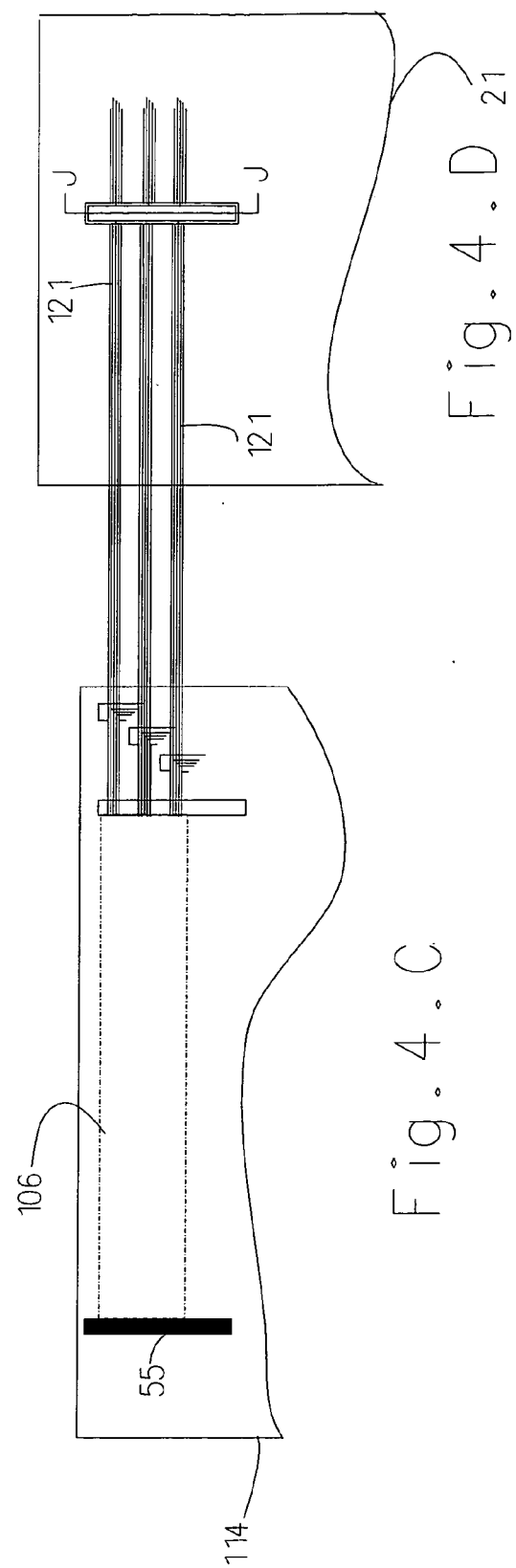

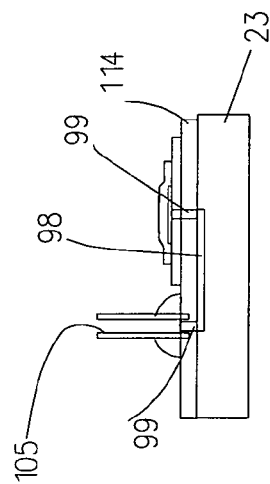
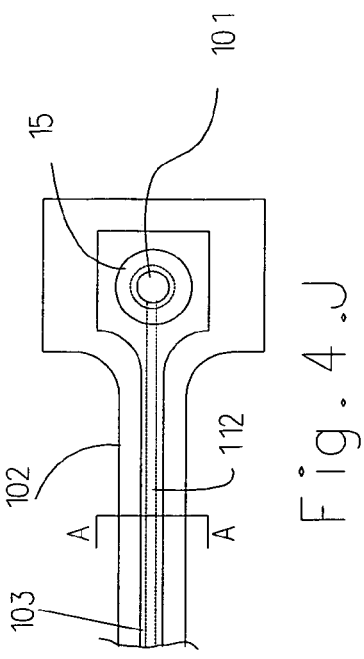
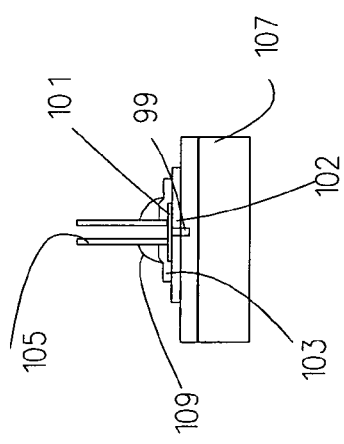
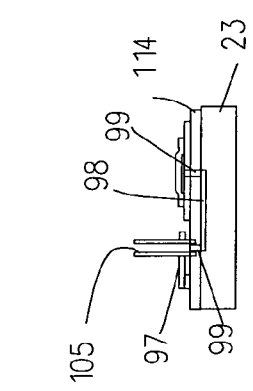
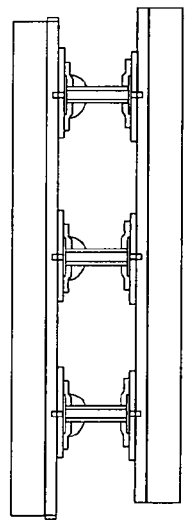

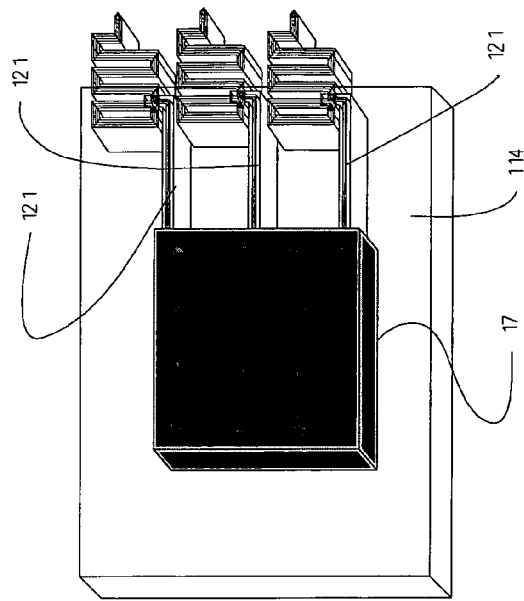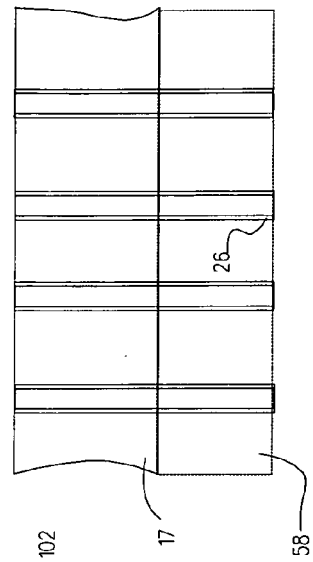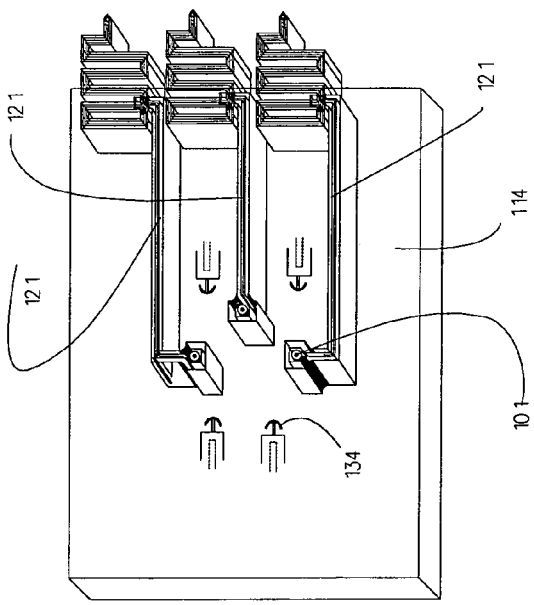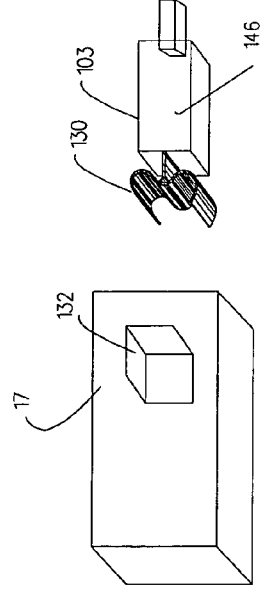
Fig. 5.A
Fig. 5.B
Fig. 5.C
Fig. 5.D

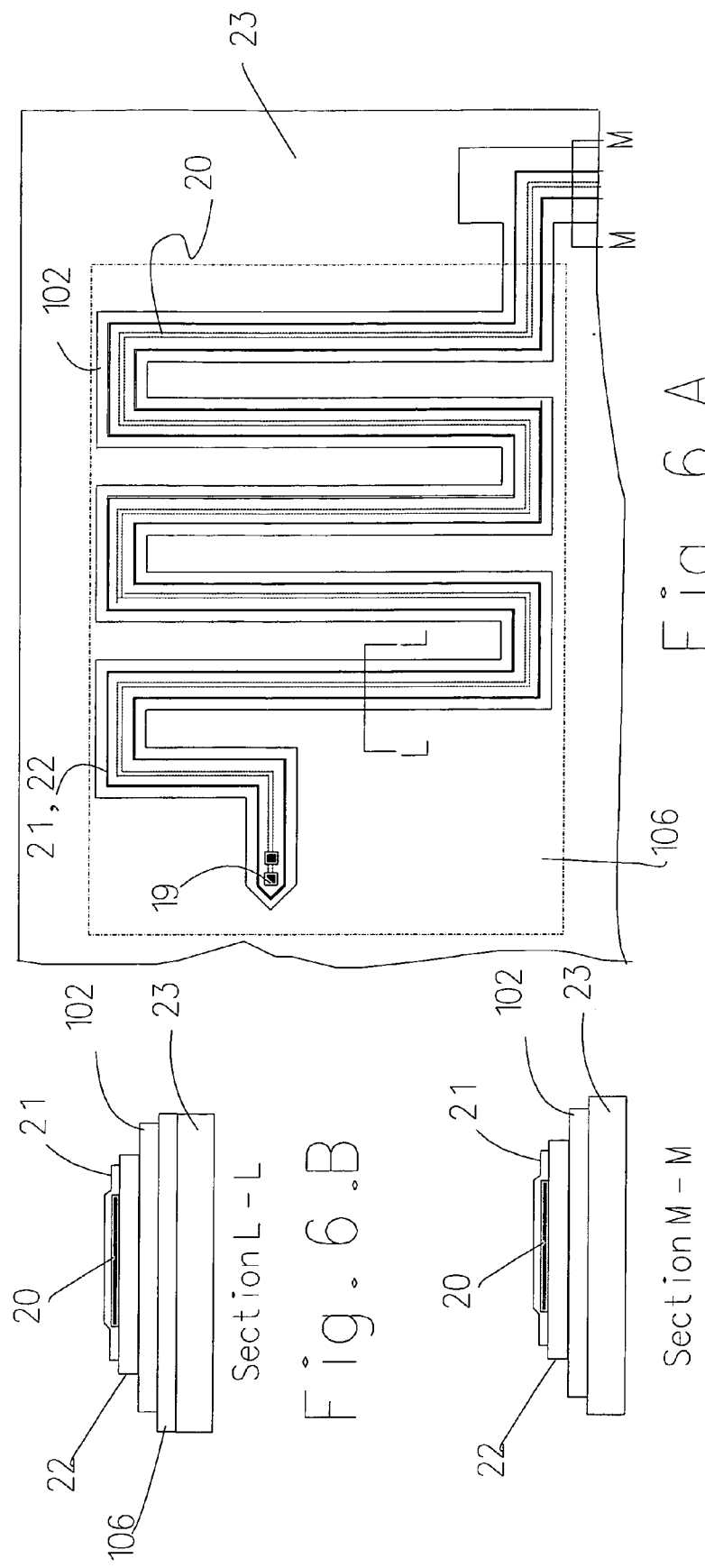

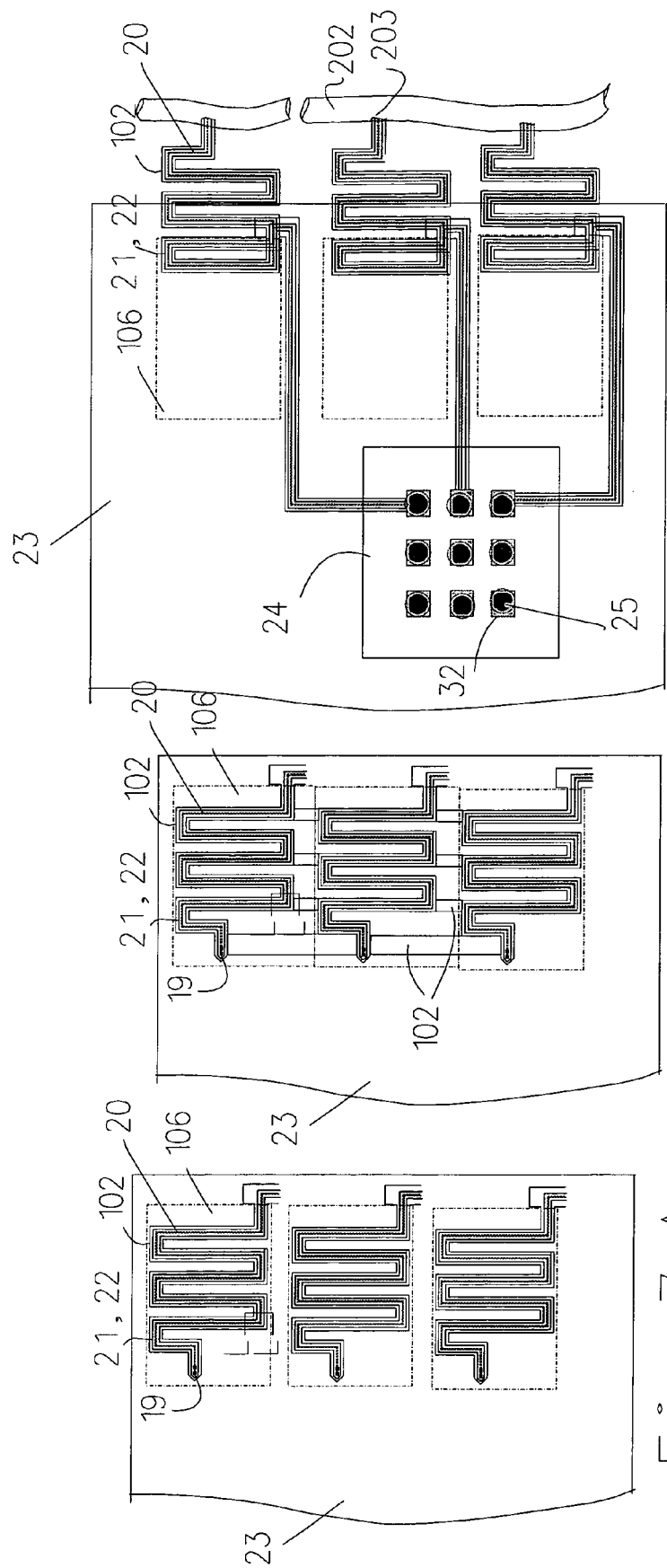

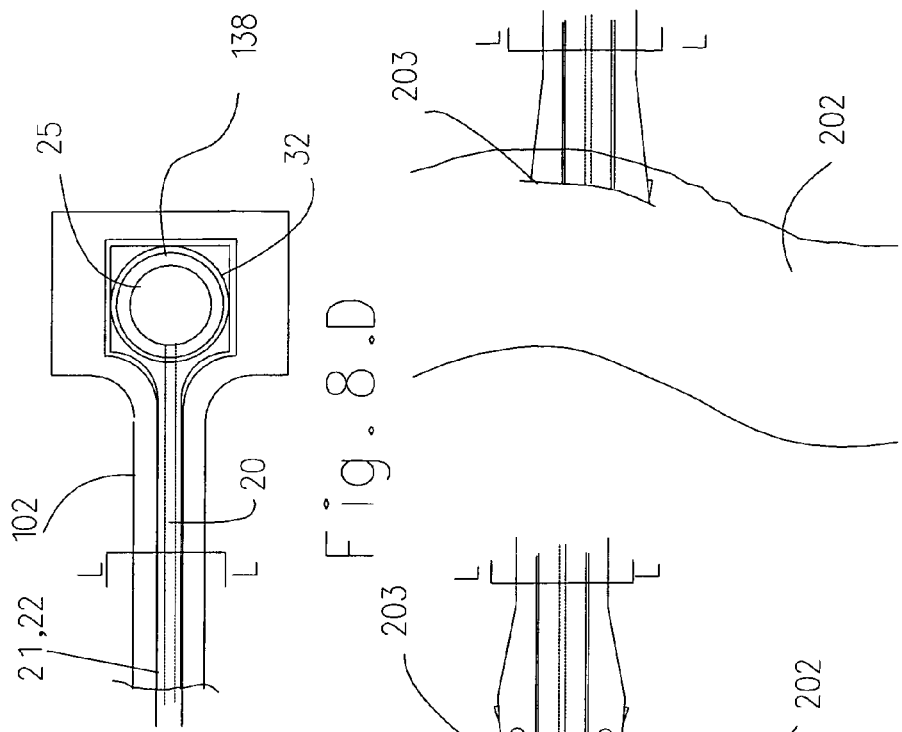
Fig. 8.A
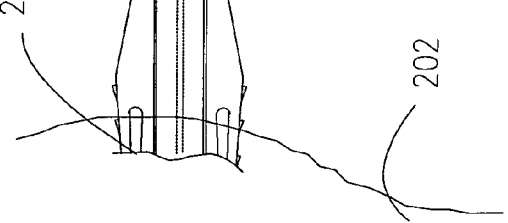
Fig. 8.B
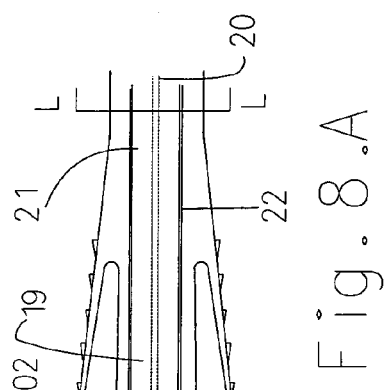
Fig. 8.C
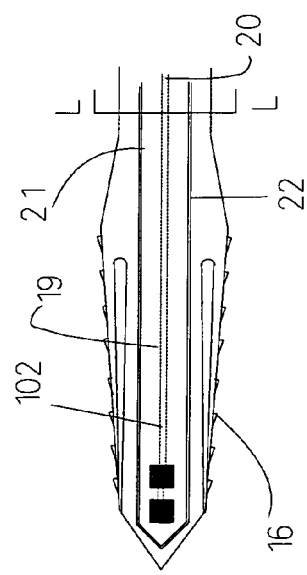
Fig. 8.D

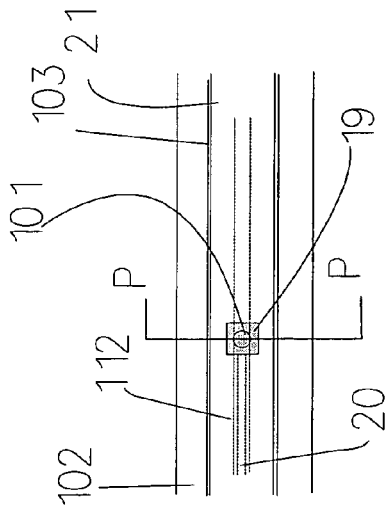
Fig.9.D
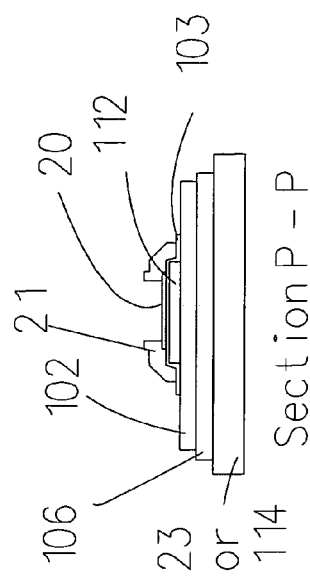
Section P-P
Fig.9.E
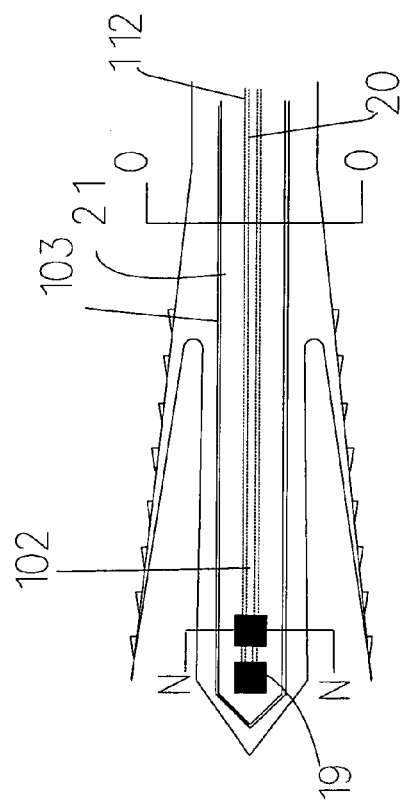
Fig.9.A
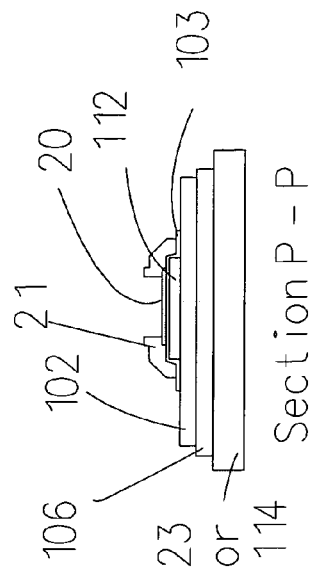
Section O-O
Fig.9.C
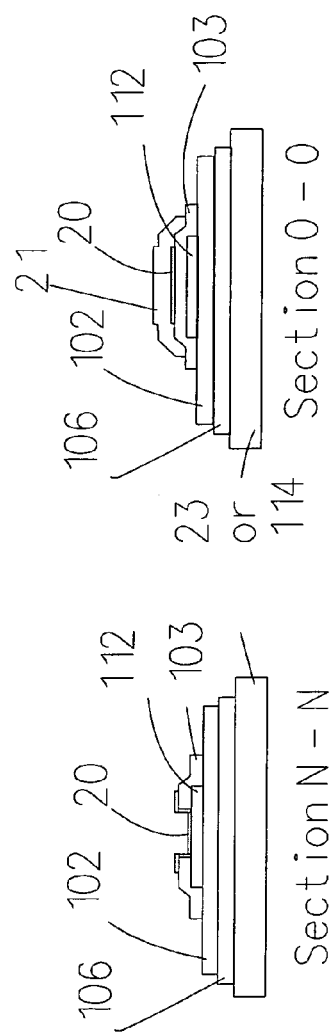
Section N-N
Fig.9.B

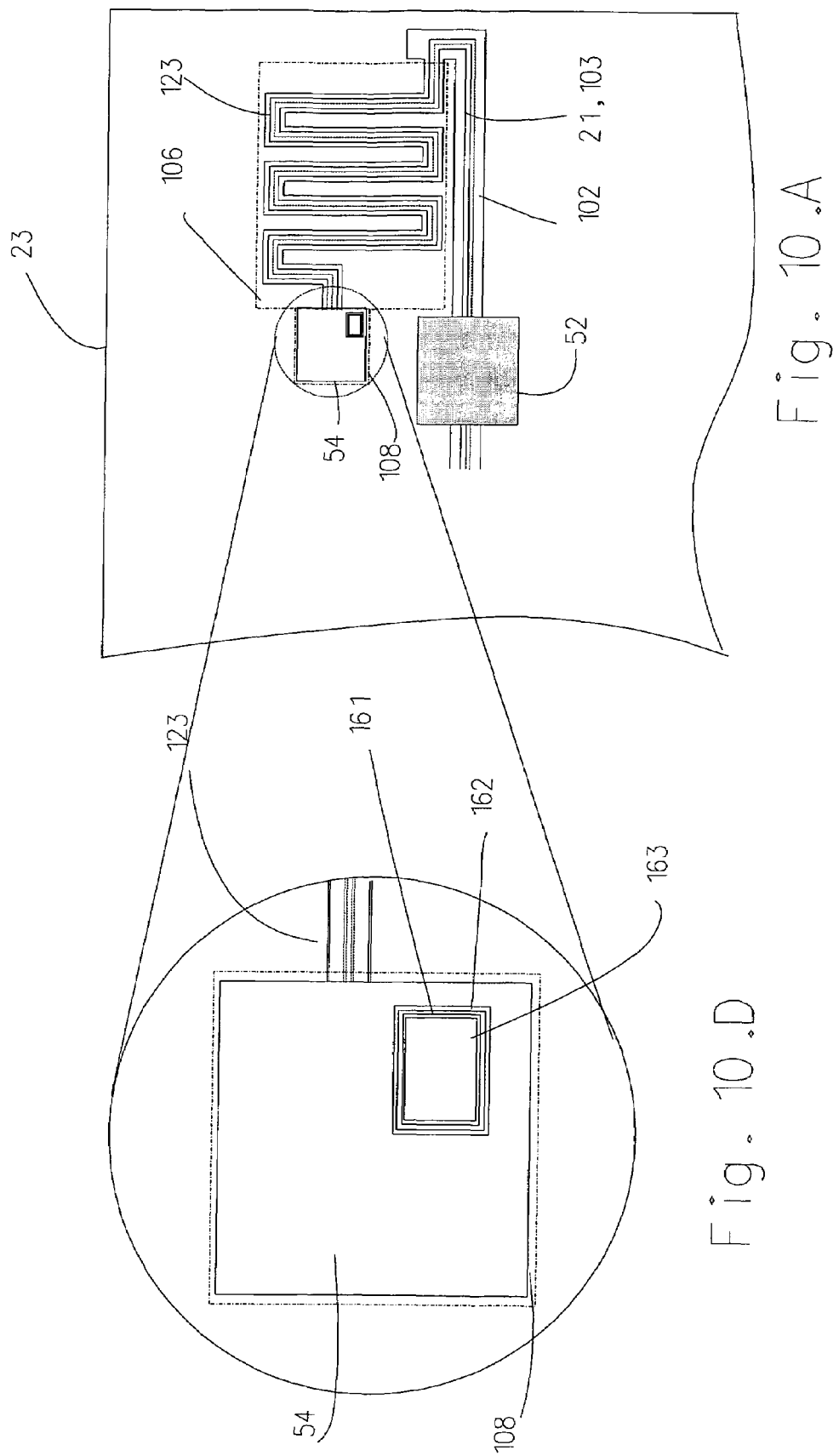

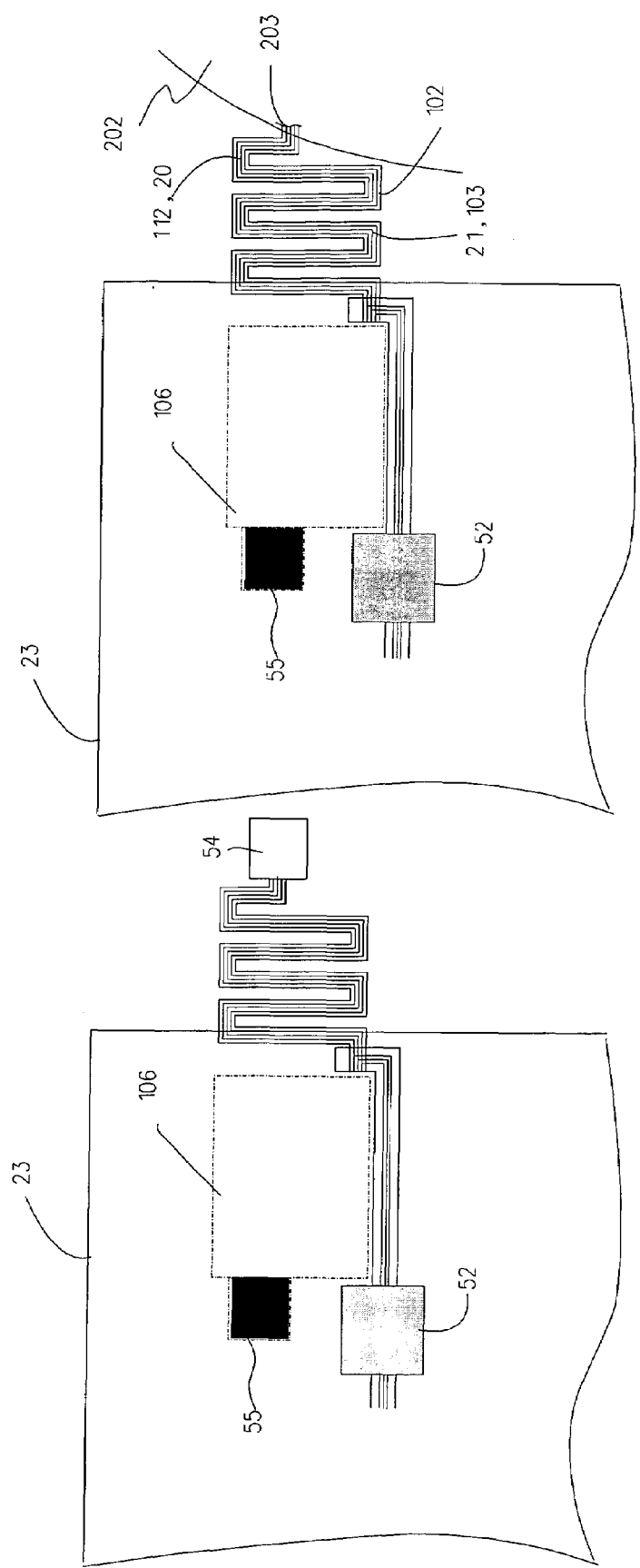

INTEGRALLY MANUFACTURED MICRO-ELECTROFLUIDIC CABLES

This application claims the benefit under 35 U.S.C. §119 (e) of U.S. provisional application Ser. No. 60/185,856, filed Feb. 29, 2000.

FIELD OF THE INVENTION

The present invention relates to microconduits and microfabrication technologies, and in particular to compositions and methods to make microconduits and microdevices integral with a substrate for use in or with a biological environment.

BACKGROUND OF THE INVENTION

In the medical field, it is necessary to implant sensors and devices that need both fluid processing and electrical signal processing. It is very costly to manufacture the miniature devices of a few centimeters in size due to the one at a time manufacturing of these devices. Also, it is very laborious to connect the fluidic and electrical cables to the sensor housing and the external instrumentation because each cable is individually integrated. The current invention embodies integrated manufacturing of a microsystem which contains both the fluidic and electrical sensors and the corresponding connectable flexible pathways or cables.

Due to the integral manufacturing of the cables on the substrate, the manual connections are eliminated and cost is dramatically reduced. The term "integrated manufacturing" refers to all processes used for batch production of semiconductor microelectronics, and all related microfacrication processes such as LIGA (see R. S. Muller, R. T. Howe, S. D. Senturia, R. L. Smith, and R. M. White ed. Microsensors, IEEE Press. 472 pages, 1990).

Microfabrication technologies include but are not limited to sputtering, electrodeposition, low-pressure vapor deposition, photolithography, screen printing and etching, micromolding, spin coating and wafer and chip level microassembly. Integrated microfabricated devices are usually formed on silicon, glass and plastic substrates.

SUMMARY OF THE INVENTION

The present invention provides at least one flexible microconduit integral at a proximal end to a substrate. The distal end of the microconduit is adapted for connection to a biological environment. The present invention also provides microsystems with at least one flexible microconduit integral at a proximal end to a substrate and with a distal end that is adapted for connection to a biological environment. The microconduit of the present invention may be a fluid conduit, and electrical conduit, or an electro-fluidic conduit that transmits both fluids and electrical signals. The microconduits may also be interchangeably referred to as cables or flex cables.

The substrate of the present invention may include integrally manufactured microdevices, microprocessors and/or microsensors. Alternatively the microdevices, microprocessors and/or, microsensors may connected to the substrate by the microconduits of the invention. The distal end of the microconduits of the present invention may be adapted with barbed ends or other structures suitable for connection to a biological environment. Further, the distal ends may carry biological, chemical or electrical sensors.

The present invention provides methods for fabricating the microconduits and other structures integral with the substrate. One method, for example, is to deposit a first patterned dielectric layer on a first sacrificial layer of the substrate. A second sacrificial layer is layered on the first dielectric layer (the second sacrificial layer is patterned). A second patterned dielectric layer is deposited on the second sacrificial layer. The second sacrificial layer is removed to form a trapped fluid microconduit and the first sacrificial layer is removed to flexibly release the microconduit from the substrate. The flexible microconduit is integral to the substrate at a proximal end and liftable from the substrate at a distal end.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a top view schematic illustration of electrofluidic flexible cables of the present invention.

FIG. 2A is a top view schematic illustration of one embodiment of the fluidic flex cables of the present invention.

FIG. 2B is a top view schematic illustration of an alternative embodiment of the fluidic flex cables of FIG. 2B.

FIG. 2C is a side view schematic illustration of one embodiment of the fluidic flex cables of the present invention showing a cross-section across line A—A of FIG. 2A.

FIG. 2D is a side view schematic illustration of one embodiment of the fluidic flex cables of the present invention showing a cross-section across line B—B of FIG. 2A.

FIG. 2E is a side view schematic illustration of one embodiment of the fluidic flex cables of the present invention showing a cross-section across line D—D of FIG. 2B.

FIG. 2F is a top view schematic illustration of one embodiment of the fluidic flex cables of the present invention showing a detail of a wave-type smooth curve.

FIG. 2G is a top view schematic illustration of one embodiment of the fluidic flex cables of the present invention showing a detail of a stove top spiral coil.

FIG. 3A is a top view schematic illustration of one embodiment of the fluidic flex cables of the present invention, the embodiment comprising multiple fluidic flexible lines.

FIG. 3B is a cross-section of one embodiment of the fluidic flex cable barbed distal end of the present invention showing the barbed end in the open position.

FIG. 3C is a cross-section of the embodiment of FIG. 3B, showing the barbed end in the closed position.

FIG. 3D is a top view schematic illustration of one embodiment of the fluidic flex cables of the present invention.

FIG. 3E is a top view schematic illustration of the embodiment of FIG. 3D showing the fluidic flex cables of the present invention lifted away from the substrate.

FIG. 3F is a top view schematic illustration of one embodiment of the fluidic flex cables of the present invention where cable flexibility is structurally constrained.

FIG. 4A is a top view schematic illustration of another embodiment of the fluidic flex cables of the present invention. The inset is a top view detail of the cable anchored to the substrate.

FIG. 4B is a top view schematic illustration of one embodiment of the fluidic flex cables of the present invention showing a female connector for the embodiment of FIG. 4A.

FIG. 4C is a top view schematic illustration of the embodiment of FIG. 4A connected to the embodiment of FIG. 4B.

FIG. 4D is a top view schematic illustration of the embodiment of FIG. 4B showing the embodiment of FIG. 4A connected.

FIG. 4E is a side view cross-section of the embodiment of FIG. 4D along line J—J.

FIG. 4F is a side view cross-section of the embodiment of FIG. 4A inset along line G—G.

FIG. 4G is a side view cross-section of the embodiment of FIG. 4B along line K—K.

FIG. 4H is a side view cross-section of one embodiment of a capillary tip connection of the present invention.

FIG. 4I is a side view cross-section of another embodiment of a capillary tip connection of the present invention.

FIG. 4J is a top view schematic of yet another embodiment of a capillary tip connection of the present invention.

FIG. 5A is a top view schematic of a modular fluidic chip connection of the present invention without a modular chip.

FIG. 5B is a top view schematic of the modular fluidic chip connection of FIG. 5B with a modular chip.

FIG. 5C is a top view schematic of modular fluidic chip connector clamp of the present invention.

FIG. 5D is a cross-section of the substrate of FIG. 5C.

FIG. 6A, is a top view schematic of an alternative embodiment of the present invention depicting flexible electrode cables manufactured integrally to the substrate connected to the electrical system on the substrate.

FIG. 6B is cross section of the embodiment of FIG. 6A along line L—L.

FIG. 6C is cross section of the embodiment of FIG. 6A along line M—M.

FIG. 7A is a top view schematic another embodiment of FIG. 6A having multiple electrical flex cables.

FIG. 7B is a top view schematic another embodiment of 7A.

FIG. 7C is a top view schematic another embodiment of FIG. 7A depicting connection to a biological environment and electronic chips.

FIG. 8A is a cross-section one embodiment of the distal end configuration of the flex cables of the present invention.

FIG. 8B is a cross-section the embodiment of FIG. 8A in an alternative configuration.

FIG. 8C is cross-sections of the embodiment of FIGS. 8A and 8B connected to a biological environment.

FIG. 8D is a top view cross-section of the embodiment of FIG. 8C depicting the proximal end of the flex cable connection.

FIG. 9A is a top view cross-section of another embodiment of a distal end configuration of the electro-fluidic passage ways of the present invention.

FIG. 9B is a side cross-section view of the embodiment of FIG. 9A along line N—N.

FIG. 9C is a side cross-section view of the embodiment of FIG. 9A along line O—O.

FIG. 9D is a top view cross-section of a micropump disposed in microconduit of the present invention FIG. 9E is a side view cross-section of the embodiment of FIG. 9D.

FIG. 10A is a top view cross-section of a further embodiment including a movable subsystem of the present invention.

FIG. 10B is a top view cross-section of the embodiment of FIG. 10A depicting the subsystem removed from the substrate.

FIG. 10C is a top view cross-section of the embodiment of FIG. 10B depicting the subsystem connected to a biological system.

FIG. 10D is a top view cross-section detail of the subsystem of FIG. 10A.

DETAILED DESCRIPTION OF THE INVENTION

While the making and using of the various embodiments of the present invention are discussed in detail below, it should be appreciated that the present invention provides many applicable inventive concepts that can be embodied in a wide variety of specific contexts. The specific embodiments described herein are merely illustrative of specific ways to make and use the invention and do not delimit the scope of the invention nor the scope of the claims appended hereto.

Definitions

To facilitate the understanding of this invention, a number of terms are defined below. Terms defined herein have meanings as commonly understood by a person of ordinary skill in the areas relevant to the present invention. The definition of some terms may be provided or further explicated in the specification where such term may be used in the description of the invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

A "substrate" may be made of silicon, gallium arsenide, silicon on insulator (SOI) structures, epitaxial formations, germanium, germanium silicon, polysilicon, amorphous silicon, and/or like substrate, semi-conductive or conductive. The substrate is typically made of single crystal silicon, and is usually lightly doped with boron, phosphorous or arsenic atoms.

A "Moat" or "Trench" refers to an open fluidic line that may be disposed within, e.g., a field oxide region or a polysilicon layer on a substrate. Moats are often constructed adjacent a polysilicon layer deposited on a substrate (when the substrate is silicon-based). Moat regions are generally formed by diffusion, and may have disposed therein a hydrophilic surface that permits or encourages fluid transfer through the moat. The moat may be covered to form a fluidic line. Alternatively, the moats may be used to provide conductive regions for accessing electrical connections that control, e.g., valves, pumps, fluid gates, sensors and the like on a substrate.

One advantage realized by the present invention is that valves, pumps and even the chamber for cell growth may be addresses not unlike a source/drain in DRAM cells, in which the source drain may be common to one or more locations that are being addressed via fluid or electrically. A moat becomes a "fluidic line" when the moat is covered.

When addressing control elements on the surface of a substrate to control fluidic events electrically, electric routing lines may be disposed adjacent to the fluidic conduits. Generally, an insulating layer will cover electric routing lines. During manufacture, both the fluidic conduits and the electrical control connections may be formed or deposited using standard wafer processing techniques, such as: field growth, plasma deposition and photolithography. These techniques are combined, e.g., to form the fluid and electrical portions of the cell culturing system. The fluidic and electrical components will generally by electrically isolated by insulating layers, except where a sensor or other control device may be included at the surface of a fluidic line to, e.g., regulate flow or take a biological or biochemical measurement.

Microfluidic Substrates

An overview of various microfabrication strategies and microfabricated structures may be useful for understanding the present invention. A simple form of a microfluidic structure, for example, has two base layers between which an elastic spacing material, which is firmly attached to at least one of the base layers and forms a geometric micro structure defining the desired liquid flow system, e.g., one or more cavities or a labyrinth-like channel.

To provide the liquid flow system, the spacing layer may be recessed through a part or the whole thickness thereof. The spacing layer forms the side walls and one of the top and bottom walls of each cavity or channel, one of the base layers forming the other of the top and bottom walls, whereas in another case the base layers form the top and bottom walls and the spacing layer forms the side walls. The spacing layer may be elastic to provide adequate sealing thereof to the respective base layer(s).

Another microfluidic embodiment includes a "multi story" sandwich structure having two or more spacing layers separated by base layers. The liquid flow systems in adjacent spacing layers communicate by apertures or bores in the intermediate base layers. Thus, complex flow channel systems may be formed. Piling several base layer/spacing layer assemblies on top of each other is one way to form such a multi story structure.

The base layers should generally be form-stable, including both non-elastic materials and moderately elastomeric materials. The purpose of the base layers is to support the spacing layer and to form part of the channel or cavity walls, as well as to maintain and ensure the dimensions of the structure in the XY-plane thereof. The XY-plane is that of the base layer plane extension, and Z is the direction perpendicular thereto. Form-stable, therefore, refers to a material that will give only small and well-defined dimensional changes under conditions dictated by the particular application.

The base layer surface should have a good surface smoothness to ensure efficient sealing under moderate pressures. A suitable surface may be obtained, for example, by the base layer being stiff or by using a flexible film placed on a planar and possibly elastic surface. Suitable materials for the base layer, which may be in plate, sheet, foil or film form, include: silicon, glass, metal or plastic, such as polyester, polyethylene terephthalate, e.g. Mylar, fluoroplastic, e.g. Hostaflon. The above mentioned apertures in the base layer, useful for, e.g., sandwich applications, may be accomplished by high precision techniques such as laser drilling or numerically controlled precision machinery.

As mentioned above the purpose of the spacing layer is to build up the side walls of the channels or cavities and provide for the desired elasticity in the Z-direction, i.e., perpendicularly to the plane extension. The material should thus be elastic, i.e., preferably be a rubber or an elastomer. Examples of suitable types of material are silicone rubber, EPDM rubber and Hostaflon.

Depending upon the method used for the manufacture of the base layer/spacing layer assembly, which will be described in more detail below, the spacing layer material should also have satisfactory properties as a molding material, such as i) low viscosity and form shrinkage; ii) a suitable curing or hardening principle, e.g., UV-light or other radiation, temperature, etc., as well as iii) a suitable hardness to provide for efficient sealing. The above properties make it possible to transfer and multiply with great accuracy the exact geometry from precision-made molds or dies to inexpensive polymeric materials. Such high precision molds or dies may, for example, advantageously be fabricated by etching in single crystal materials.

The elastic or resilient properties of the spacing layer or layers permit a very good seal between base and spacing layers, or between adjacent spacing layers. The spacing layer (when stabilized) may also have surface properties providing suitable surface characteristics when joined to a base layer and defining a cavity or channel therewith, e.g., hydrophobic—hydrophobic interaction for applications involving aqueous solutions.

It is readily realized that there are materials that will satisfy at the same time the requirements on both the base layer and the spacing layer. The spacing layer and one or both of the base layers may then be made of the same material. In such a case the spacing layer and one base layer may also be integral. The multi-story structure may, of course, also be made up from such integral base layer/spacing layer units. An example of a material that may be used in this respect is Hostaflon.

In one embodiment, the spacing layer does not fill the whole space enclosed by the two base layers, but only to the extent for sufficient wall thicknesses of the channels or cavities defined thereby. For example, in a winding channel the spacing layer material defining it will exhibit the same winding geometry but with a wider cross-section. In, this way, a smaller sealing area is obtained, thereby requiring a smaller total sealing force to be applied for a given surface pressure.

The elasticity of the spacing layer(s) may also be used to give the structure the function of a pump or valve by varying the force acting in the Z-direction, i.e., normally to the base and spacing layer planes. The force required to compress the structure to obtain such a pumping action will also be smaller the shorter the spacing layer extension.

The required recessing of the spacing layer is accomplished by forming the spacing layer against a planar mold, e.g. a sheet or plate, which has a molding surface provided with a relief pattern being the negative of the desired geometric structure to be exhibited by the spacing layer. Such a mold may, for instance, be produced by etching, surface coating, laser processing, electrochemical etching, mechanical processing, or combinations thereof, of a substrate of, for instance, silicon, quartz, ceramic, metal or plastic material, e.g., PMMA or Teflon™. The mold used for forming the spacing layer may very well be a replica of an originally manufactured master mold produced therefrom by casting or molding.

One method of producing such a mold involves etching. The material of choice is then a single crystalline material, including silicon or quartz, or various group III/V materials, including gallium arsenide, i.e., a material which has such a structure/composition that a well-defined surface will be produced by chemical processing in gas or liquid phase, and which has such mechanical/thermal properties that it will withstand the pressures and temperatures required by such forming process. One such material is a single crystalline silicon.

The etching of a desired relief pattern on the surface may be effected, e.g., by providing the substrate with an etch stopper layer (usually by oxidation), coating with a photosensitive layer (photoresist), exposing the surface through a mask defining the desired relief pattern, and developing the exposed areas to remove the photoresist therefrom. The bared etch stopper layer is then opened in those areas, removing the remaining photoresist mask, and finally etching the bared substrate surface areas to the desired depth.

The molding of the spacing layer may be performed in various ways. For instance, in one embodiment the spacing layer is formed by compression molding, involving impression, or coining or embossing, of the spacing layer material. In this case, the spacing layer material, optionally attached to or integral with a base layer, is applied against the mold surface, and the assembly is pressed together by an external force. In case the material is thermoplastic, increasing the temperature thereof lowers the viscosity and the spacing layer relief pattern formed is then made permanent or stabilized by lowering the temperature. Other ways of stabilizing the spacing layer include cross-linking thereof, e.g., by UV-radiation, a catalyst, heat, etc. The spacing layer material may be a thin layer of a cross-linkable liquid, such as a silicone rubber, coated on the surface of the base layer.

In another embodiment, the spacing layer is formed by an injection molding. The base layer is applied against the mold surface, and the base layer and the mold are pressed together by an external force. A cross-linkable liquid, e.g., a silicone rubber, is then pressed into the mold cavity formed, whereupon it is cross-linked by appropriate cross-linking means, such as UV-light. Alternatively, a thermoplastic polymer melt might be injected to form the spacing layer when stabilized by cooling.

When the hardening or stabilization of the spacing layer is completed, the base layer/spacing layer assembly is removed from the mold. In order to facilitate the release of the formed spacing layer from the mold, the latter may be treated with a release agent prior to the molding operation, e.g., a fluorotenside in liquid phase or a fluoropolymer in gaseous phase.

After removal from the mold, the second base layer may be applied to the spacing layer to complete the desired cavity or channel system. Optionally, the second base layer may be covalently or otherwise bound to the spacing layer by suitable.

To achieve optimum sealing between the spacing and base layers, the assembly is placed in a clamp between planar faced clamps capable of exerting a compressive force on the assembly. Other clamping methods, including "3-" and anchor-type clamps, may also be used to make the assembly perform the pumping action.

For electrophoresis, the second base layer may be provided with two electrical contacts, e.g., gold strips, at each end. In such a case, the second base layer may be made reusable.

Microfluidic structures may, of course, advantageously also be adapted for microfluidic purposes other than electrophoresis. Among those are, e.g., capillary chromatography, micro-reaction cavity procedures, miniaturized liquid communication units, biosensor flow cells, cell culture, and so forth. Reaction cavities constructed in accordance with the invention may, for example, be used for various forms of solid phase synthesis, such as peptide or oligonucleotide synthesis, PCR, DNA-solid phase sequencing reactions, just to mention a few.

Adhesives and Encapsulation

The use of adhesive layers and encapsulation of the microchambers may also be used in conjunction with the present invention. For example, a liquid thermo-setting plastic such as liquid epoxy or a polyimide may be used as an adhesive. Epoxies are used because of their toughness, processibility, rigidity, chemical resistance, low shrinkage and adhesive properties. Epoxies are also used because they can adhere to a wide variety of substrates, organic and inorganic.

While there are many different epoxy resins, most commonly epoxies are formed by reacting diglycidyl esters of Bisphenol-A with epichlorolhydrin. In many cases, bromine is reacted into the phenol ring section of the molecule to improve flame retardance. Multifunctional epoxies may also be used with the present invention, and are characterized by having more than two epoxide rings per monomer.

The basic epoxy resin may be cured or crosslinked by adding a co-reactant or catalyst. Many different compounds can react with either the epoxide ring or the hydroxyl group of the epoxy ring such as aliphatic amines, aromatic amines, and anhydrides, or catalysts such as piperidine or boron trifluoride ethylamine. One advantage of using an aliphatic amine as a curing agent for epoxies is that curing occurs at room temperature or temperatures slightly above room temperature. Further, the curing is fast, is resistant to low heat and is a high exotherm. Examples of aliphatic amines that may be used to cure epoxies include diethylene triamine or dicyandiamide, for example.

Alternatively, an aromatic amine may be used to cure the epoxy, the advantages being long pot life, elevated curing temperatures and higher heat resistance. Samples of aromatic amines that may be used with the present invention include metaphenylene diamine or diamino diphenyl sulfone. Alternatively, anhydrides may be used, such as hexahydrophthalic anhydride. Anhydrides may be selected because they are safer, have a very long pot life, can be cured at an elevated temperature and have very high heat resistance.

Another advantage of epoxy based adhesives is that they can be made with any viscosity, from liquid to solid, and can be flexible or rigid, based on the types of mineral fills or fibers that are used to fill the epoxy. Another advantage of epoxies is that they can be combined with glass containing fabrics to produce laminated printed circuit boards, such as FR-4.

An alternative liquid adhesive used with the present invention may be a polyimide polymer. Polyimide polymers may be used as an adhesive due to their heat resistance at cryogenic temperatures and their radiation resistance. Polyimides also have favorable electric properties and low outgassing, making them extremely useful in the extreme environment of space and at high temperature. Typically, copolymers used to polymerize polyimides are amideimide, imide phenolics, bismaleimide, epoxy imides and polyester imides.

The adhesive layer, alternatively, may be a liquid epoxy such as X-43-5000, available from Shi-Etsu Chemicals, Ltd., or polyimides such as G7631, -G8320 or Hitachi HM122u. The bonding process generally involves attaching the substrate on a printed circuit board at a temperature above room temperature and allowing the epoxy or polyimide liquid adhesive to cure.

An important parameter of polymeric materials is the glass transition temperature, $T_g$. The $T_g$ is the temperature at which long-range cooperation between polymer chains becomes sufficient to allow the material to deform in response to an external force. In the present invention a temperature of about 215 and 250° C. during processing may be used to cure the thermosetting adhesive for the methods of the present invention.

Printed circuit boards for use with the invention may be constructed from a material such as FR-4 which is available from, for example, Motorola Inc., U.S.A. FR-4 is an epoxy resin reinforced with a woven glass cloth. In selecting the material for printed circuit board, one skilled in the art will recognize that four parameters should be considered, namely, thickness, dielectric constant, glass transition temperature and the coefficient of thermal expansion.

Thickness is dependant on the number of layers required and the amount of reinforcement used in a given layer. The reinforcing glass cloth can range in thickness from 2 mil per sheet (type 106) to about 8 mil per sheet (type 7628). Dielectric constant is determined by a combination of the resin used and the thickness and type of reinforcement used.

Standard FR-4 has a dielectric constant of about 4.5. The constant can be reduced to about 3 by replacing the epoxy resin with a cyanate ester resin. The greater the thickness, however, the greater the problems associated with thickness control, rough surfaces, excessive drill reflection and poor resin refill.

The temperature at which a resin changes from a glass-like state into a "rubbery" state is generally designated as $T_g$. Standard FR-4 is made with a bifunctionally polymerizing epoxy that has a $T_g$ of about 110° C. Higher $T_g$ temperatures, such as 125–150° C. may be withstood by using a tetrafunctional epoxy. For higher $T_g$ values, in the range of 150° to 200° C. a cyanate ester:epoxy blend can be used. Additionally, polyimides provide for printed circuit boards having a $T_g$ above 250° C.

The coefficient of thermal expansion for FR-4 is about 16 ppm/C. A difference in the coefficient of thermal expansion between the printed circuit board made from FR-4 and the substrate 30 may lead to failure of the integrated circuit/microchamber package during, not only the assembly of the integrated circuit/microchamber package, but also during the use of integrated circuit/microchamber package.

Nanotechnology

The microstructures and microdevices described herein may be combined with nanostructures and nanodevices (such nanotechnology is embraced by the terms "microstructure" and "microdevice" as used herein) assembled "bottom up," atom by atom, by nanoassemblers. Such nano structures include fullerene-derived structures such as "bucky" balls and nanotubes. Other examples include photonic switches, fiberoptics, and nanorobots.

The essential components in a molecular assembler are: (1) a positional capability and (2) the tip chemistry. Positional capability might be provided by one or more small robotic arms, or alternatively might be provided by any one of a wide range of devices that provide positional control. The emphasis, though, is on a positional device that is very small in scale: perhaps 0.1 microns (100 nanometers) or so in size.

It is worth noting that current methods in computational chemistry are sufficient to model the kinds of structures that may appear in a broad class of molecular machines, including all of the structures and reactions needed for some assemblers.

Logic elements ("locks," roughly the equivalent of a single transistor) need a volume of only a few cubic nanometers. Even including system overhead (power, connections, etc.), the volume per element should still be less than 100 cubic nanometers. A 10,000 element logic system (enough to hold a small processor) would occupy a cube no more than 100 nanometers on a side. That is, a volume only slightly larger than 0.001 cubic microns would be sufficient to hold a small computer. This compares favorably with the volume of a typical cell (thousands of cubic microns) and is even substantially smaller than subcellular organelles. Operating continuously at a gigahertz such a computer would use less than $10^9$ watts. By comparison, the human body uses about 100 watts at rest and more during exercise. Slower operation and the use of reversible logic would reduce power consumption.

A variety of molecular sensors and actuators would fit in such a volume. By contrast, a single red blood cell is about 8 microns in diameter. Devices of the size range suggested above (~0.1 microns) would easily fit in the circulatory system and would even be able to enter individual cells.

With such molecular tools, a small device able to identify and kill cancer cells appears feasible. The device may have a small computer, several binding sites to determine the concentration of specific molecules, and a supply of some therapeutic agent that could be selectively released to kill a cell identified as cancerous. The present invention may be adapted to administer such devices to circulate freely throughout the body, periodically sampling its environment by determining whether the binding sites were or were not occupied.

Acoustic signals in the megahertz range are commonly employed in diagnostics (ultrasound imaging of pregnant women, for example). The ability to detect such signals would permit a microdevice of the present invention to safely receive broadcast instructions. By using macroscopic acoustic signal sources, the microdevice could determine its location within the body. Very precise control over location of the microdevice's activities could thus be achieved.

The microdevice could readily be reprogrammed according to the present invention to attack different targets (and could, in fact, be reprogrammed via acoustic signals transmitted while it was inside the body). The general architecture described here provides a flexible method of destroying unwanted structures such as bacterial infestations, arterial plaque, parkinson's and alzheimer's plaques.

A second application of nanotechnology may be to provide metabolic support in the event of impaired circulation. Poor blood flow, caused by a variety of conditions, can result in serious tissue damage. A major cause of tissue damage is inadequate oxygen. A simple method of improving the levels of available oxygen despite reduced blood flow would be to provide an "artificial red blood cell." From a purely structural point of view, a very large "bucky ball," i.e., a sphere whose surface is a single layer of graphite may be suitable.

A broad range of biological molecules could be anchored to the surface, either directly or via polymer tethers. Controlled release of oxygen from the diamondoid sphere could be accomplished using selective transport methods. For example, by driving a rotor at the right speed, oxygen may be released from the internal reservoir into the biological environment at the desired rate.

More sophisticated systems would release oxygen only when the measured external partial pressure of oxygen fell below a threshold level, and so could be used as an emergency reserve that would come into play only when normal circulation was interrupted.

Such a nanodevice may simultaneously absorb carbon dioxide present at high concentrations (in the tissue) and release it when it was at low concentrations (in the lungs), to provide a method of removing one of the major products of metabolic activity. Calculations suggest that a human's oxygen intake and carbon dioxide output could both be handled for a period of about a day by about a liter of small spheres.

Tissues already suffering from ischemic injury (tissue injury caused by loss of blood flow) might no longer be able to properly metabolize oxygen. In particular, the mitochondria will fail at some point. Increased oxygen levels in the presence of nonfunctional or partially functional mitochondria will be ineffective in restoring the tissue. More direct metabolic support, however, could be provided by the present invention.

The direct release of ATP, coupled with selective release or absorption of critical metabolites (using a selective transport system), may restore cellular function even when mitochondrial function had been compromised. Microdevices of the present invention, injected into the body to restore metabolite levels, should be able to operate autonomously for many hours.

While levels of critical metabolites could be restored, other damage caused during an ischemic event may also have to be dealt with. In particular, there may be significant free radical damage to various molecular structures within the cell, including its DNA. Molecular machines of the present invention with externally provided power could be used to restore function. Such devices may be able to continue operating even when the tissue itself was no longer functional.

Micromachines of the present invention, operating in the human body, could monitor levels of different compounds and store that information in internal memory. They could determine both their location and the time. Thus, information could be gathered about changing conditions inside the body, and that information could be tied to both the location and the time of collection. Physical samples of small volumes (micro/nano tissue samples) could likewise be taken to provide a picture of activities within healthy or injured tissue.

"Snapshots" of tissue samples and analyze the structure down to the molecular level. First, a small tissue sample may be either fixed or frozen. Chemical fixation may be used to rapidly block most tissue changes. Ultra fast freezing of small tissue samples is an effective method of halting essentially all chemical processes and diffusion of all molecules.

Once fixed or frozen, the tissue sample could be analyzed. For example, with current STM and AFM technologies one may scan the tissue surface in molecular detail, and store that information in a computer. Once the surface had been scanned, it could be removed in a very selective and precise fashion, and scanned again. As an example, the use of a positionally controlled carbene has been proposed for use in the synthesis of complex diamondoid structures.

Such a positionally controlled carbene, for example, is highly reactive and, if positioned at an appropriate site on the surface of the tissue being analyzed, would readily react with a surface molecule. The surface molecule could then be removed. A wide variety of other "sticky" molecular tools could be brought up to the surface and allowed to diagnostically or therapeutically interact with surface molecules. Additionally, the interaction could be detected and analyzed by the present invention.

Microfluid Control Elements

Microvalves

Microfluidic valves may include an electrostatically controlled flap valve or an electromagnetic valve, positioned in a moat or fluidic line or conduit. Printed electrical control lines electrically connected to the microvalves may be used to provide electrical signals that open or close the valves. In addition to electrostatic or electromagnetic valves, other conventional valves known to those skilled in the art may be used, including but not limited to flap valves, movable membrane valves, slide valves, hinge or butterfly valves, piezoelectric, electrorheological, thermoexpansive, or shape memory alloy valves, bimorph based thermal valves, rotary, or even simple pressure actuated spring valves.

As will be appreciated, microactuators such as valves may be constructed with a variety of machining or micromachining techniques, including those associated with conventional integrated circuit or printed circuit board fabrication. For example, chemical etching, electron beam lithography, photolithography, laser ablation, or other standard integrated circuit processing technologies may be used to define necessary valve apertures. Alternatively, injection molding, high precision numerically controlled machines, or stereolithography may be employed for valve construction.

Materials used in construction may include plastics, metals, glasses, or ceramics. In one possible embodiment, plastics, epoxies, glass, silicon, polysilicon, silicon nitride, silicon oxide, oxynitride, plastics or metals such as electroplated copper or aluminum, or any other available material suitable for lithographic processing may be used to define the necessary microactuator, valve, valve housing, valve structures, or conduits.

Electrodes may be any conductive metal or polymer, while movable components may be constructed from electroplated copper, plastic films, aluminum coated mylar, plated nickel, or polyimide sandwiched aluminum. Large arrays of the microactuators having one or more movable components may be constructed, with small scale arrays having tens or even hundreds of thousands of individual microactuators distributed throughout a dielectric substrate in accordance with the present invention.

To precisely control fluid flow through conduits, electromagnetic valves constructed in part using conventional printed batch processing techniques are particularly suitable. An actively addressable electromagnetic valve, for example, may be constructed in part from movable components and structures formed on a substrate according to the present invention. The substrate may be drilled, etched, mold formed or otherwise modified to define a microchamber having an inlet for inward flow and an outlet for outward flow. A compressively stressed membrane constructed from substantially uniform permalloy or other magnetically susceptible material may be positioned in the chamber. The membrane is stressed to normally close the valve by blocking the outlet.

To open the valve requires electrically addressing (with, e.g., a row address line and a column address line) an electrical lead such as a copper planar coil formed on a dielectric layer of the substrate. In conjunction with a permalloy layer, this creates sufficient electromagnetic force to pull the membrane to an open position, opening the valve and allowing fluid into the chamber to escape through the outlet. When the current is reduced, the mechanically biased membrane springs back into blocking position, closing the valve.

An alternative embodiment of an electromagnetic valve relies on an imposed mechanical bistability for a membrane to permit passive matrix addressing. In contrast to the membrane discussed above, normally biased to be closed, the membrane of this embodiment is bistable, being stable both in a closed position, and in an opened position. The valve is very similar to the previous valve, differing materially only in the addition of a secondary copper planar coil (with row and column address lines) formed on a dielectric layer of the substrate, along with a secondary permalloy layer.

In operation, electrically addressing the copper planar coil creates sufficient electromagnetic force to pull the membrane to an open position, opening the valve and allowing fluid in the chamber to escape through the outlet. When the voltage is reduced, the mechanically biased membrane is left in one of its two mechanically stable positions, so it remains in that open position. To close the valve, the row and column address lines may be transiently electrically addressed, resulting in sufficient electromagnetic force to pull the membrane to its original blocking position, closing the valve and preventing fluid in the chamber from escaping through the outlet.

Another bistable valve embodiment of an electromagnetic valve is stable both in a closed position, and in an opened position. The bistable valve differs from the previous uniform permalloy membranes by use of permalloy patterning to create a poled magnetic layer and magnetic field line patterns.

In operation, voltage addressing of the copper planar coil causes current flow in the coils to create sufficient electromagnetic force to pull the membrane to an open position, opening the valve and allowing fluid in the chamber to escape through the outlet. When the current is reduced, the mechanically biased membrane is left in one of its two mechanically stable positions, so it remains in that open position. To close the valve, the row and column address lines may be transiently electrically addressed to reverse current direction, resulting in sufficient electromagnetic force to push the magnetically-poled membrane to its original blocking position, closing the valve and preventing fluid in the chamber from escaping through the outlet.

Yet another single coiled electromagnetic valve has a bistable membrane stable both in a closed position, and in an opened position, and only requires a single coil for bistable operation, with reversal of current direction in the coil causing the membrane to move back and forth between the open and closed position. In contrast to valves described above, however, the membrane of the valve supports a planar coil rather than the planar copper coil being supported by a dielectric.

In operation, electrically addressing the copper planar coil causes current flow in the coils to create sufficient electromagnetic force to pull the membrane toward a poled permalloy region, opening the valve and allowing fluid in the chamber to escape through the outlet. When the current is reduced, the mechanically biased membrane is left in one of its two mechanically stable positions, so it remains in that open position.

To close the valve, voltage address lines may be transiently electrically addressed to reverse current direction, resulting in sufficient electromagnetic force to push the magnetically poled membrane to its original blocking position, closing the valve and preventing fluid in the chamber from escaping through the outlet. As compared to the magnetically poled embodiment, the valve described has faster operation due to the lower inductance and lower mass of the planar coil relative the transiently created permalloy magnetic circuit.

In addition to electromagnetic valves, other valve structures may of course be used in the present invention. For example, a simple electrostatic flap valve formed using a bonded dual laminate substrate may be batch constructed by appropriate modification of conventional printed circuit board construction techniques. Such a valve may be formed by laminating a first board to a second board. The first board has a drilled out air outlet conduit and supports an anchor and flap, both generally formed from etched copper or other conductor, optionally coated with an insulative layer such as parylene. The second board has an electrical lead actively addressable by row and address lines to apply a predetermined threshold voltage sufficient to hold the flap closed against fluid pressure applied through a drilled out inlet. Since the flap valve is normally open under applied fluid pressure, to open the valve merely requires one of the addressing lines to reduce applied voltage to the electrodes, allowing the flap to move away from the surround electrodes and causing fluid to jet through outlet. As will be appreciated, various modifications of this valve scheme are contemplated, including but not limited to rearranging the flap to maintain a normally closed, rather than normally open position.

Other valve structures may be formed by using a number of printed circuit board/microelectromechanical construction techniques. For example, passively addressable electrostatic flap valves and flap valve arrays may be constructed by soldering, gluing, using photo-patternable glues or laminates, electroforming fabrication techniques or any other suitable attachment techniques to form a mechanically bistable flap or flaps with flap anchors embeddable in a substrate. The flap covers a drilled out hole, and may be moved between an open and closed position only when both electrodes are addressed, with voltage addressing of a single electrode being insufficient to move the flap.

If additional bistability for either flap designs is needed, provision of additional latch or "catch" electrodes may be used that permit maintenance of a small constant voltage to hold a flap in position until application of much greater switching voltage.

Micropumps

Micropumps, such as a micro-peristaltic pump, are useful to impel fluid movement in the microconduits of the present invention. For example, a pump channel may be etched into a substrate, lined with electrically conductive strips whose top surfaces are covered with electrically insulating material. The strips are separated from each other by electrically insulating barriers formed, e.g., at a right angle to the channel. The channel is then covered by an electrically conductive flexible membrane.

With no voltage applied, the membrane is linear in cross-section and lies over the channel. By applying a suitable voltage between the membrane and each of the conductive strips in succession, the membrane may be electrostatically pulled into the channel at successive positions along the length of the channel, thereby creating a peristaltic pumping action.

The characteristics and performance of such electrostatic actuated peristaltic pumps are principally dependent on the properties of the flexible membrane, which may exhibit an elasticity of about 30%. For low differential pressures and moderate temperatures a graphite impregnated polyurethane membrane material of thickness 5 micrometers is satisfactory. In vacuum applications, surface metallization of polyurethane membranes is typically necessary to reduce porosity. Higher voltages, such as 100 volts, are required to generate the electrostatic forces necessary to overcome the larger differential pressures, and high progression rates (500 m/sec) are required to pump non-viscous gases (vacuum pressures).

One embodiment includes a push-pull dual cavity of a microperistaltic pump, where two silicon substrates are placed together with a single membrane sandwiched between them. The membrane may again be graphite impregnated polyurethane. Between the membrane and each substrate are positioned respective conductive strip layers and respective insulating layers. Each substrate further has a linear conductor pit and a bond metal trench located adjacent one another and running parallel to a channel. While the thickness of the insulation layer must be of submicron dimensions to ensure high electrostatic forces on the membrane, the channels may be of millimeter dimensions.

A conductive strip layer often includes a number of actuator strip elements that begin at the top edge of the channel and traverse down the channel and up the channel to its opposite edge. Thus, the substrate top surface curves down on either side to form a walled channel having a rounded bottom portion such that no sharp edges are involved. The actuator strips are rectangular conductor elements lying parallel to one another, transversely to the channel and laid out down the length of the channel. They may be, for example, 0.1 millimeter in width such that a group of 200 strips occupies about 20 millimeters.

The space between the elements is filled with insulation provided by an insulating layer to provide interstrip insulation that insulates each actuator element from the next element. Thin lead elements travel away from each actuator element to a respective conductive pad that provides a wire bond pad for establishing electrical connection to a shift register or other electronic component. The actuator strips, leads, and pads may be formed by etching a single deposited conductive metal layer such as a gold layer.

Each conductor pit may have a conductor channel formed of conductive metal that establishes electrical connection to the membrane. The membrane has complementary upper and lower lips on respective ends that fit into and mate with a respective conductor channel to both establish electrical connection to the membrane and position and hold the membrane in place when the two substrates are bonded together and hermetically sealed with the assistance of bond metal placed in the bond metal trenches between the substrates and the insulation layers. A ledge is further formed on each substrate parallel to the channel in order to provide for membrane thickness and permit some squeezing to hold the membrane in position.

Micromachining techniques have evolved from the microelectronics industry. Both the additive processes of thin film deposition or vapor deposition and the subtractive processes of chemical or plasma etching are appropriate for the manufacture of both the channels and pump. The bulk etching of channels in silicon, quartz, or other suitable substrate, whether semiconductor, metallic, or otherwise, and its fusing to a mirror image wafer is one technique of creating a microperistaltic pump. Surface micromachining may also be deployed where a patterned sacrificial profile of the channel is created over which the actuator and insulation materials are deposited.

Isotropic etching techniques may be employed in an embodiment of the micropump to create a smooth, contoured concave channel. Once this channel and other grooves and ledges have been created, a metal layer of a few hundred Angstroms in thickness is vapor or sputter deposited evenly over the whole top surface of substrate. An even layer of photoresist is then applied and a photo mask is thereafter used to define the etch barriers to form the metal actuator strips, leads, pads, and conductive membrane connection channels. The comparatively large depth of field required for submicron definition of the actuator elements in the channel may require special care.

Following the etching and removal of the photoresist, a vapor epitaxial deposit of a micron of silicon dioxide, or like insulation material, is required to form the insulation layers. The insulation layers provide the insulation between the actuator strips themselves, the insulation between the actuator strips and the membrane, and the insulation between the strips and the bond metal to be placed in the bond metal trenches.

After annealing the material to consolidate the insulation layer, another photoresist coating is applied and then another photo mask in order to define the membrane connection channel and insulation profile, e.g., to expose the conductive strip connection pads. The final wafer processing step involves the vapor or sputter deposition of a column of interwafer bond metal in the bond metal trenches, for example, using a shadow mask. The pump die shells or substrates are then cut from their wafer, the flexible membrane placed between two shells, and the assembly clamped together and placed in an oven until the bond metal melts, pulls the two dies together, and fuses the two dies together to form a solid structure hermetically sealed down both sides by the bond metal. A typical bond metal is a mixture of gold and germanium.

Where the membrane is clamped, it is in intimate contact with the thin insulation layer of both shells. When a voltage is applied between an actuator element and the membrane, an electrostatic attraction force, proportional to the square of the applied voltage and the inverse square of the insulation thickness (<1 micron), pulls the membrane down. The membrane rolls down the surface of the insulation, due to the fact that the greatest attractive forces are generated where distances from conductive strips are the smallest (i.e. insulation thickness). Conversely, when a voltage is applied to the strip in the upper shell, the membrane rolls up its channel surface.

When a neighboring conducting strip is energized the membrane rolls forward and down across the activated elements. The membrane is initially drawn up onto the upper channel surface and advanced along the channel, then the membrane is released for several periods before the membrane is drawn down into the lower channel and then rolls down the lower channel surface. Thus, a membrane "wall" is placed across the composite channel. By connecting the actuator elements up to the outputs (e.g., leads and pads) of a shift register a clocked bit stream of "1s" or "0s" apply a voltage or no voltage with respect to the membrane, respectively, to the actuator elements along the channel in a sequential manner. The actuation progression provides a miniature peristaltic pump.

In the case of a dual channeled pump, dual shift registers may be used to provide interlaced and interlocked bit streams such that a membrane wall is advanced down channel. By alternate inversions of the bit stream sequences, multiple membrane "bubbles" will move down the channel, pushing the entrapped fluid in front of each membrane "wall" and pulling the fluid behind each membrane "wall."

The pump may be valveless and impervious to gas bubble entrapment. It also does not require priming and may tolerate the adherence of small foreign articles (small compared with cavity dimensions) on channel or membrane surfaces. The pump may also be self-purging by pushing everything before the membrane with its rolling motion across the channel surface.

Such pumps may deliver and measure minuscule volumes of "incompressible" liquids and at precisely determined times or time intervals, for example, by actuating the membrane at times recorded in the memory of a programmed digital processor or computer. The precision with which volumes may be measured (or delivered) by the disclosed microperistaltic pump is that associated with a single stepped advance of an actuator strip. The product of the channel cross-section and actuator pitch thus defines this minimum volume. For example, a relatively large channel, by micromachining standards, with a cross-section of 0.5 $mm^2$ and an actuator pitch of 0.1 mm has a minimum volume displacement of 50 nanoliters.

In continuous flow microreaction chambers, separate pumps may be used for each reagent and respectively run at clocking rates that are proportional to the required concentration ratios. In batch mode operation, providing sufficient clock pulses to deliver the necessary number of minimum volume displacements may meter specific volumes of reagents. When the pump is operated in the static or intermittent mode the "across channel" membrane functions as a valve. If reaction cell input ports are directly coupled to pumps, the membrane "valves" may isolate the chamber against appreciable back pressure and for an indefinite period between successive deliveries of metered volumes of reagent.

If an electrostatic peristaltic pump will only function with fluids that are electrically non-conductive, magnetic renditions might be considered for electrically conductive fluids. Electrically conductive fluids are more complex, require significantly greater amounts of power and function over a more restrictive temperature range.

Micropumps have a number of advantages. At micron dimensions, small voltages create high electric fields over small distances that, in turn, are capable of generating substantial electrostatic forces. Electrostatic actuators consume no power (fractions of Mw at high frequencies) and function from absolute zero to the eutectic melting temperatures of interwafer bonding materials.

Microconduits

Referring now to the drawings, substrate 114 in FIG. 1 may be a silicon wafer, silicon wafer coated with biocompatible polymers, glass wafer, or plastic laminate implanted inside biological environment 201. The term "biological environment" comprises the interior or exterior of plants, the interior or exterior of animals and humans, the processes occurring in tissue and culture in the interior of chambers and vessels of size micro and macro, the processes occurring in tissue and culture on glass slides, biological processes occurring in oceans, and atmosphere.

Biocompatible fluidic lines 121 and 124, electrode flex cables 123, and electro-fluidic flex cables 122 are manufactured integral to the substrate. One end of these flex cables is fixed to the substrate and is connected to the various electro-fluidic systems on the substrate. The electro-fluidic systems on the substrate are pump 52 for pumping fluids in or out. The micropumps may be Lamb wave devices, electrokinetic pumping, electrosmotic pumping, membrane pumping, or other microfabricated pump structures. The other devices may include a micromixer for mixing chemical species, liquid flow meter 51 for measuring the amount of liquids, chemical analyzer, thermal heaters, and fluid transportation channels.

Substrate 114 also houses modular fluidic chip 17 which may be a flip chip or back side connected to the substrate using glue or snap type of connectors. The modular chip 17 contains reagents that are releasable to the biological environment 201. The reagents may be loaded on to chip 17 at the factory by micropipetting, ink jet printing process or other means.

Substrate 114 has either peripheral or area array pads on which solder bumps connect a modular electronics chip 24 which may be a flip chip or back side bonded to the substrate. The purpose of the electronics chip is to calibrate the various devices on the substrate, store calibration data and operational sensor data, and provide the signal conditioning and control functions. Electrical wiring strands 34 may be directly connected to the substrate 114 via the solder 25 on the solder pads 32. The wiring is connected to the twisted pair cables 36 with connector 38. The twisted pair cables are connected to the external monitoring or control computer 61.

Flex cables 121, 122, 123, and 124 are liftable from surface 106 of substrate 114 because the sacrificial release layer beneath the cables is etched away by wet chemicals such as HF, resist developer solution or by dry plasma etch. The free distal end of the cables is inserted at 203 and 204 to the biological tissue, which may be veins 202, and organs 205 of the biological environment 201. The cables transmit the fluids and electrical signals to and from the distal ends inside the biological tissue 202 and 205 to substrate 114. Flex cable 124 is pierced out of the biological environment 201 at 206 for injection and withdrawal of fluids on to substrate 114.

Chemicals or biological reagents 302 are injected or withdrawn 301 into or out of substrate 114 via fluid reservoir 101 in flexible fluid cable 124 with fluid delivery instruments such as a hypodermic needle 301. The reagent reservoir of the flex cable may also have a silicone rubber wall so that the reagent can be introduced by a hypodermic needle. Plurality of cables and connections are realized and various reagents are deliverable over a span of time either continuously or sporadically.

Various physiological measurements are carried out by the chemical analysis and detection systems that are present on substrate 114 and on the flexible cable distal ends. The substrate and the connected electronics and fluidics systems are monitored and controlled externally by the software on computer system 61. Computer system 61 does various functions as to periodically read the memory and store the data, and actively monitor the electro-fluidic systems on the substrate 114. In an alternate embodiment, the computer and the software is also embedded in vivo on to the substrate and no external wiring is needed. In this case, the power is supplied by on-board low voltage batteries, incident electromagnetic radiation or incident optical radiation converted to electrical energy by on-board photocells.

One of the applications of the above embodiment is the physiological and cell monitoring and control of lab animals with the implanted micro-electro-fluidic system. This may be useful for studying the physiological response of the animal to various reagents, and pathogenic conditions, including viruses, cancer and other genetic and proteomic diseases. One main advantage of the embodiment is that each animal can be retrofitted with its own micro electro-fluidic system and a large set of animals can be tested. This is nearly impossible with a macro or miniature system due to the high device cost and system integration labor involved. Some of the physiological parameters of interest that may be measured include pH, temperature, blood gases, blood pressure, antibody presence or absence, ECG, bio-electrical signals and respiratory flow sensing.

The present embodiment may also be housed external to the biological environment and the flex lines implanted, for example, under the epidermis to collect various fluids for testing. Reliable fluid extraction may be possible by using the micropumps on the substrate to eliminate variations in fluid flow caused by external factors.

The embodiment of FIG. 1 may participate in supplying nutrients to the biological environment and extract the waste and hence aid in cellular growth. It may also supply various enzymes to foster the bioprocessing such as in a gland. Tissue may be placed or grown on the substrate and integrated into the body of an organism for purposes such as implantable dialysis microsystems and implantable liver or pancreas microsystems.

FIG. 2A shows one embodiment of a fluidic flex cable of the present invention. The embodiment consists of polysilicon or polymer or other dielectric layer 102 deposited on top of a sacrificial layer 106 such as silicon dioxide, metal or photoresist either by CVD, injection molding, screen printing or spin coating. A next layer of a sacrificial material such as silicon dioxide, metal or photoresist 112 is layered on top of the patterned layers 102 and patterned by conventional photolithography techniques. Layer 103 which is polysilicon or polymer or other dielectric layer is deposited and patterned on layer 112. When sacrificial layer 112 is removed preferentially by wet etching with dilute HF or developer solution, or plasma etching, it creates a trapped fluid passage way as shown in FIG. 2C. This passage way is open to the surface where ever the fluid need to come out or go in as in 101. When sacrificial layer 106 is removed, flex cable 102, 103 is free to move above the surface of the substrate 114.

The substrate 114 may be silicon wafer, silicon wafer coated with biocompatible polymers, glass wafer, or plastic laminate. Where conduit lines 102, 103 do not need to be lifted, they may be anchored to substrate 114 at bottom layer 106 to integrate the system on the substrate. In FIG. 2D, bottom layer 106 is not present.

Another way of creating the fluidic passage way is to deposit polysilicon layer 103 with a gap of 1 micron to 3 microns as illustrated in 113 of FIG. 2B and FIG. 2D. In this case, the sacrificial layers may be silicon dioxide or photoresist or metal which is removed by etching before the polysilicon opening 113 is oxidized to close. The oxidation increases the volume and hence closes the opening created in the polysilicon line 103 forming a closed passage way.

To enhance biocompatibility, silicone, polyurethane or other biocompatible polymers may be used as the layer materials as described above or the final structure may be coated with such materials. The flex line shape may be varied to allow for either decreasing the stress concentration at the corners or for certain degrees of freedom. Possible configurations include wave type smooth curves, as in FIG. 2F, and stove top type spiral coils, FIG. 2G, which is much softer in the vertical direction than the other directions.

In the embodiment of FIG. 3A, multiple flexible fluid lines are built similar to the procedure described for FIG. 2A and FIG. 2B. The manufacturing procedure, however, is extended to many fluidic pathways on a single cable. The distal ends of the flex lines are modified as in FIG. 3B to include barbed ends 16 to prevent the slipping of the microcatheter or the flex cable from biological environment 201. Barbed ends 16 are made of the same material as layer 103 and may be moved closer to each other as in FIG. 3C by exerting force on the sides during insertion into biological environment 201. The ends spring out once the insertion is completed and the side force is taken out. The angle of the barbed ends prevents the slippage of the ends from the tissue.

In the embodiment in FIG. 3D, multiple flex lines 102,103 are integrally manufactured on the substrate as described above. In FIG. 3E, the multiple lines are lifted up and inserted through an incision 203 into the biological tissue 202. An integrally manufactured micropump and valve system 52 pushes fluids into and out of the biological fluid line 202. In FIG. 3F the degree of freedom of the flex cable is constrained by cross bars 18 of structural layer 103. The constraint prevents the flex cables from entangling with each other. The invention covers all degrees of freedom or constraint of flexible cables for specific applications.

Fluidic flex cables of the present invention enable the fluidic interconnection between the silicon-on-insulator or silicon-on-silicon or plastic substrate 114 to cartridge 21 of similar or different materials or between two substrates 114. The substrate may be coated with biocompatible materials if implantation into tissue is needed. The interconnection flexible cables 121 in FIG. 4A are manufactured integral to substrate 114. The flex cables are anchored on the left to a part of the substrate 107.

The island 107 is formed by either deep reactive ion etching or wet chemical etching of a trench. The etched trench width is any where from 1 micron to 10 microns. Before the trench touches the buried oxide, the timed etch is stopped and a window 99 is opened. Then both the trench 108 and the window 99 is etched in silicon. The trench etch stops on oxide and the window etch is stopped before reaching the barrier oxide. The gap 108 and 99 may be refilled with releasable material such as spin on glass or spin on polymeric sacrificial materials that may be removed by etching. The flex cables have the trapped fluidic passageways 112 with the fluid passage opening 101 on top of 107.

In FIG. 4F, cross section G—G shows the details of connecting capillary tube 105 with the fluidic cables. If the sacrificial material used for the fluid passage way 112 is silicon dioxide, then plastic capillaries may be used. Otherwise, glass capillaries may be used. Capillary tube 105 may be attached with glue 109 that is UV curable around the outside edge of capillary 105. Capillary tube 105 may be positioned inside circular openings 101 on 107 and centered in the openings.

The fluid passage that is formed between layers 102 and 103 opens into capillary tube 105 allowing passing of liquids between the cable fixed ends and the capillary tube. Interconnection flex cable 121 passes over sacrificial layered region 106 and may be anchored down to the substrate outside this region. The cables are connected to the various systems on the substrate. Similar cable end configuration may be manufactured on the cartridge 21 as in FIG. 4B except for two changes. One is that trench 108 is not present since part of substrate 107 does not need to come out. The second is that the capillary tubes are not installed. The cross section K—K in FIG. 4G shows the details of the various layer's arrangement.

The fluidic interconnect lines are lifted from region 106 in FIG. 4C along with the assembly on 107 because the release etch removes the sacrificial material, releasing the flex cable 121 and the entire subassembly 107 from the substrate. Hole 55 is created. Subassembly 107 may be turned 180 degrees and moved to the right to reach cartridge 21 and aligned with the mating subassembly in FIG. 4G and glued to the cartridge in a similar fashion to the procedure described for FIG. 4F above. This establishes fluidic connection between substrate 114 and cartridge 21. The completed connection on cartridge 21 is shown in the top view in FIG. 4D and the cross section details are shown in FIG. 4E. The procedure of this embodiment may be used to integrate various substrates and cartridges to build complex fluidic networks.

Variations of the capillary tip connection designs are possible. One variation is shown in FIG. 4I. The flex cable is formed on substrate 114 with a through hole 99. The through holes inside the flex cables and the capillary tubes are aligned and connected by channel 98 formed on a different wafer 23 which is bonded to substrate 114. Multiple tips can be installed for a parallel fluidic interconnect. In an alternative embodiment, the capillary tips may be attached by press fit techniques instead of gluing to the substrate.

One embodiment of a spring clip 97 is shown in FIG. 4H. Various other springs can be used (B. L. Gray, et.al., Sensors and Actuators, 77, 57–65). The spring is manufactured from the top layer 102 with materials such as polysilicon, silicon nitride or polymers such as polyimide. One end of the spring is free and the other end is anchored and the entire spring is suspended above the substrate as in surface micromachining techniques familiar to the person skilled in the arts.

One embodiment of a spring is a spiral designed such that when the capillary tube is inserted, it pushes the tip of the spiral aside and the stiffness of the spiral exerts a counter force on the capillary tube keeping it tightly gripped. Variations of the spring design and materials are possible and are contemplated by the present invention.

FIG. 4J represents another variation, where a rubber ring 15 of silicone, PDMS or other flexible polymer is integrally manufactured by semiconductor processes. The pattern 102, 103 with the embedded fluid passageway 112 may either be anchored to the substrate or may be free. The mating male connection may be a short capillary tube that can push against the o-ring.

One application of the above design is to provide a test environment for a modular fluidic chip that could be mounted by flip chip or back side connection techniques. Various tests may be performed to evaluate the performance of the test chip. The flex lines, for example, may act as the fluid drawing lines to bring in the chemicals necessary to complete the test. Another possible configuration is the lifting of the flex cables with capillary tips and inserting the tips in the glass microfluidic chips to carry out fluid I/O and use electrical flex cables for the high voltage supply for electrophoresis. The present invention contemplates automated microfluidic testing and further miniaturization of systems on microfluidic chips.

Leak tight fluidic interconnections are accomplished by the integral manufacturing scheme of the present invention. Connections are minimized and hence reliability increased. Human error in alignment accuracy is eliminated and manual mistakes are minimized.

FIGS. 5A and 5B illustrate an embodiment comprising a modular fluidic chip 17 front or back side connected to substrate 114 having various fluidic 121, electrical and electro-fluidic flex cables. The reason for a modular connection is that any fluidic chip manufactured with various process sequences can be integrated to substrate 114. Modularity has multiple advantages. One is that a pharmaceutical company can fill chip 17 with proprietary reagents and the chip can be purchased and modularly installed. Another advantage is that the chip can be replaced with another one of the same or different kind to replenish the reagent supply.

The distal free end of flex cable 121 is free to be integrated to the biological environment. The other fixed end of cable 121 has a configuration similar to FIG. 4J. Multiple ends of this same type are arranged in a standard configuration. This is the female side of the connection. The modular chip 17 in FIG. 5D, has male connectors 26 formed as follows: the modular chip 17 is etched to generate through wafer holes 26; the wafer is oxidized to form a thin layer of oxide, leading to microcapillary tubing 26 around the hole; wafer back side 58 is blanket etched to remove silicon preferentially to expose the oxide tubing, producing the capillary tubing of the modular connection. Now the capillary tubes are aligned with holes 101 on the female side and either by gluing as in FIG. 4E–4H or by press fit connectors, as in FIG. 4H, the connection is completed.

In FIG. 5C, clamp 130 is used to pull the top fluidic chip 17 vertically down for a fluid tight connection. Vertical actuation of clamp 130 is obtained by thermal actuator 146 where layer 102 is thin and layer 103 is wide. When current is passed through 102 to 103 the current density in the thinner bottom layer is higher generating higher temperature. Layer 103 then expands more than the layer 102 causing an upward bending. Embodiment of FIG. 5C works optimally when the layers 102 and 103 are made of doped polycrystalline silicon with good conductivity.

Other variations also exploit the principle of differential thermal expansion and a combination of polymers and polysilicon or metal may be used as the actuation materials and a person of ordinary skill in the art can design a thermal actuator for vertical displacement. The end of the actuator contains a spring or clamp 130 in the shape of "3" patterned in layer 103. Any force on the sides of the spring make it close and release of the force makes the spring expand out. The modular chip 17 contains on the face facing down, a mating hole 132 to accept the spring 130.

When thermal actuator 146 is actuated, spring 130 moves up and pushes into hole 132 to the other end of the hole. The spring springs out on the other side of the hole and when the power to the actuator is removed, large downward forces arise pulling the modular fluidic chip 17 down to achieve a good fluidic interconnect. One embodiment is the "3" spring design, but an "anchor" type of spring or clamp 134 (shown in FIG. 5A) is also well suited to the present invention.

The modular approach to the fluidic flip chip or back side connection facilitates the introduction of any suitable drug from the chip and can be introduced into the biological environment. Modularity provides unprecedented flexibility to the present invention. A large variety of reagents may be tested sequentially, making clinical trials for drug study very inexpensive and highly automated. A study database may be obtained to facilitate quicker approval by the FDA.

FIGS. 6A, 6B and 6C describe the on-substrate integral manufacture of electrical flex cables which have one free distal end that may be moved to connect to the biological environment. The other, proximal, end of the flex cable is anchored to the substrate so that electrical continuity exists from the distal end to the substrate. The anchored end continues on the substrate to electrically connect to the electro-fluidic system on the substrate including other flip chip bonded microprocessor units.

Substrate 23 may be silicon, silicon on insulator, plastic laminate or glass and has sacrificial material 106 on top. Structural layer 102 provides mechanical strength. A dielectric layer 22 may either be CVD deposited or spin coated and patterned on structural layer 102. Metal conductive layer 20, which may be gold, platinum or titanium, is deposited by sputtering or direct evaporation on dielectric layer 22 and patterned by wet or dry etch techniques familiar to the skilled in the art. Capping dielectric layer 21, deposited on top of the metal layer, may be patterned to open windows 19. The total thickness of the flex cable may be from 4 microns to 10 microns. Sacrificial layer 106 may be etched away by dilute HF or plasma etching. The flex cable is now free to move. FIG. 6C shows the cross section of the anchored portion of the flex cable where the release layer 106 is absent.

FIG. 7A illustrates a plurality of flex electrode cables as described in FIGS. 6A, 6B, and 6C. The cables can be mechanically integrated to constrain movement in particular directions. FIG. 7B shows one embodiment where flex cables are connected by layer 102 to mechanically constrain them from getting entangled with each other. Other embodiments for upward motion and for increased twisting may also be integrally manufactured on the chip. The distal free ends of the flex cables are now free to be implanted into the biological tissue 202.

Substrate 23 may have bond pads for flip chip or back side connection of other electronics or microprocessor chips. One skilled in the art can realize that IBM's C4 process, Tessera's chip scale packaging, Quad Flat Pack, Ball Grid Array type of chip connection schemes are equally well suited. Depending on the packaging scheme area array or peripheral array solder bond pads 32 are placed on the substrate. Solder balls 25 on the electronics chip 24 are then connected to the solder bond pads on the substrate 23. The solder balls are reflowed in a reflow oven to complete the electrical connection. Because of the reflow requirement, polymers used on the substrate have to withstand these temperatures without considerably deforming.

One advantage of the modular approach to electronics is that low cost off-the-shelf chips can be used and no interaction with the electronics wafer fabs is needed. This considerably increases the flexibility of replacing defective electronic chip. Modularity increases the reliability of the electronics.

The present invention allows the modular attachment of microprocessors that are manufactured externally and connected to the substrate by flip chip bonding, back side contacts or chip scale packaging techniques. The entire assembly may be connected to an external computer and various monitoring or control electronics via insulated, biocompatably coated gold, aluminum, copper or platinum strands attached to the substrate by solder bonding techniques familiar to the person skilled in the art of semiconductor electronics. The present inventory enables in vivo calibration, signal processing, signal storage and data storage functions individually to each implanted substrate and individually to each biological environment.

The distal end configurations of the flexible electrical cables of the present invention are shown in FIGS. 8A, 8B, 8C for various biological sensing functions. The manufacturing process is similar to the description in FIGS. 6A, 6B, and 6C. The electrode tips are treated with various biological detection agents and the signal generated is transmitted on to the substrate for further processing.

One embodiment in FIG. 8A shows two exposed electrode square ends 19 that can be embedded into biological tissue. Barbed ends 16 may be moved closer to each other for insertion and are made in layer 102 for mechanical strength and can also be made thicker if need be by keeping layers 21 and 22 on top. Barbed ends 16 prevent the distal end from slipping out of the tissue. The distal ends of the electrode flex cables may also carry capacitance measurement sensor, pressure sensor, a thermistor for temperature measurement and Ph sensing electrodes.

One embedding scheme is shown in FIG. 8C. Barbed ends 16 are pushed close to each other and the sharp tip is inserted into the biological tissue 202 making an incision 203. Once barbed ends 16 are let go they spring back and, due to the blunt shape, have higher resistance against slipping out of incision 203. Incision 203 may also be stitched close to prevent any fluid leakage.

FIG. 8D shows an embodiment where the flex cable has solder bumps 25 or indium microbumps on the bond pads 32. Bond pads 32 are treated with solder bump metallurgy 138 for proper adhesion of the solder balls. The cable is lifted and placed on the end face down against a bond pad where the interconnection needs to be achieved. Either by reflow techniques or mechanical pressure, the solder ball or the indium microbump reflows and adheres to the opposing bond pad to make an electrical connection with the electrical flex cable.

The present invention describes integrally manufactured electro-fluidic flex cables in FIGS. 9A–9E. The manufacturing procedure combines the process layers used in FIGS. 2C, 2D, 2E, 6B, and 6C. In FIGS. 9A, 9B and 9C, fluidic passageway 112 is formed under the electrically conductive metal layer 20 by semiconductor processing techniques familiar to the person skilled in the arts.

One application for electro-fluidic flex cables of the present invention is the supply of Ph buffer reagents to electrodes for Ph calibration. In another application, the electrodissolution of the metal electrode 20 at 101 that is on top of the fluid chamber 112, releases the fluid underneath.

By controlling the current that reaches the metal electrode, and the Ph of the fluid surrounding the electrode, selective corrosion can be induced causing rupturing of the electrode to release the fluid underneath the electrode. The technique of programmed release of reagents may be very useful for laboratory clinical testing. AIDS patients, for example, sometimes have to take up to 50 pills a day. Most of the time their stomachs cannot handle the volume of reagents, inducing vomiting and upsetting the drug balance needed to keep the HIV count low. In cases like these, the present invention can ease patient suffering. Another application is the release if Polymerase Chain Reaction (PCR) products in vivo or in vitro for direct genetic therapy or gene manipulation.

In yet another embodiment, an intermediate layer 103 exists between the metal layer 20 and the fluidic passageway sacrificial layer 112 to create a membrane pump. One embodiment of the valve less membrane pump is shown in FIG. 9D with the cross-section in FIG. 9E. The membrane pump works by the principle of differential coefficient of thermal expansion between the metal layer 20 and the underneath conductive or dielectric layer 103. When current is passed through the metal conductive layer, heat is generated and, due to the difference in thermal expansion coefficient, the membrane moves either up or down causing pumping action on the fluids underneath the pump.

The above described flexible electro-fluidic cables allow electro-fluidic subsystems 54 designed on a SOI type of substrate 23 to be completely released and moved from the substrate into the biological environment 201. SOI substrate allows the complete release of the parts on the wafer when the silicon is cut out and the bottom silicon dioxide is etched away as known to the person trained in the arts of silicon microsystem fabrication.

The process sequence is depicted in FIG. 10D. A 30–50 micron deep silicon on 1 micron thick buried oxide SOI wafer may be used. Etch a trench around the top silicon layer 163 with deep reactive ion etching all the way down to the buried oxide. Stop the etching on the buried oxide. An etch width of 1–6 microns is maintained around silicon island 163. Then, the etch trench is filled with CVD silicon nitride 162 of 0.5 to 1 micron thickness. The nitride is patterned to give dielectric isolation from the silicon substrate. Then, polysilicon 162 is deposited and patterned. The polysilicon fills the trench/silicon nitride gap, closing it. The purpose of filling the CVD silicon nitride gap with polysilicon is to relieve the stresses in the nitride layer.

Island 163 thus formed is electrically completely isolated from the rest of the wafer and is ideal for building electronic thin film devices. Another deep reactive ion etching is done to cut a trench of 1–6 microns width in the wafer and is filled with sacrificial oxide 108. Island 54 is completely bound on the sides and bottom by sacrificial oxide. More semiconductor processing may be done to generate various microelectromechanical devices on the island 54 and 163 that operate based on the electrical, mechanical, chemical and fluidic principles known to those skilled in the art. One example is a linear x-y translational table with a revolving disk with teeth that can make incisions in tissue. Grippers, electrodes, pumps, fluid wells, etc. are integrally manufactured with the flex electro-fluidic cables.

FIG. 10A shows the electro-fluidic flex cable 123 manufactured as described in FIGS. 9A, 9B and 9C. Fluidic passageways 112 and electrical passageways 20 may be formed in the cable. Cable 123 may be connected to the silicon subsystem 54 by passing over the trench oxide 108. The flex cables and the subsystem 54 may be released from the substrate by etching away all the sacrificial layers.

This entire subassembly 54 may be moved as in FIG. 10B. Cavity 55 is left behind by the removal of island 54. Subassembly 54 is inserted through incision 203 into biological environment 202 as shown in FIG. 10C. The attached flex electro-fluidic cables 112, 20 supply and draw the necessary electrical signals and fluids to and from subsystem 54. Subsystem 54 on the distal end of flex cables 112, 20 may perform various electromechanical and chemical functions in biological environment 202.

Among the applications where the current embodiment and its variation may be used are plaque or tissue removal in clogged arteries. Integrally fabricated microsurgical tools as well as fluid circuit bypass systems of the present invention may be required to remove the debris generated in the arteries. The microsystem lift and insert approach shown in FIGS. 10A–D, may find utility, for example, in flow sensing for anesthesia or asthma.

While the invention has been described in reference to illustrative embodiments, the description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A microsystem comprising:
    a monolithic substrate;
    a microconduit anchored at a proximal end with the monolithic substrate, having unanchored remaining length, wherein the microconduit is a coil that can stretch and contract and the free distal end is adapted for implantation in a biological environment;
    the microconduit integrally manufactured on the monolithic substrate;
    the microconduit comprises a fluid microconduit;
    the microconduit is part of the electrical circuit on the monolithic substrate; and
    the monolithic substrate having fluidic elements etched in them and connected to the microconduit.

2. The microconduit of claim 1, wherein the substrate comprises a microdevice.

3. The microconduit of claim 2, wherein the microdevice comprises one or more of the following elements:
    an island,
    a microvalve,
    a micropump,
    a microspring,
    a microgripper,
    a microclamp,
    a micro-o-ring,
    a fluid reservoir,
    an electrode,
    a signal generator,
    a signal detector,
    a microprocessor
    a microelectromechanical device,
    a microgear,
    a microratchet,
    a micromixer,
    a liquid flow meter,
    a chemical analyzer,
    a heater, or
    a fluid transport channel.

4. The microconduit of claim 3, wherein the micropump is selected from the group consisting of: a lamb wave device, an electrokinetic pump, an electro-osmotic pump, and a membrane pump.

5. The microconduit of claim 1, wherein the substrate comprises a microfluidic chip.

6. The microconduit of claim 5, wherein the microfluidic chip is modular.

7. The microsystem of claim 1, wherein the substrate further comprises one or more peripheral or area array pads.

8. The microsystem of claim 7, wherein the one or more array pads comprise solder bumps disposed thereon for connecting modular electronic chips thereto.

9. The microconduit of claim 1, wherein the microconduit comprises an electrical microconduit.

10. The microconduit of claim 1, wherein the microconduit comprises an electro-fluidic microconduit.

11. The microconduit of claim 1, further comprising a substrate package, wherein the distal end of the microconduit is adapted for connection to the substrate package.

12. The microconduit of claim 1, wherein the distal end is adapted for connection to a second substrate.

13. The microconduit of claim 1, wherein the distal end is adapted for connection to a second microconduit connected to a second substrate.

14. The microconduit of claim 1, wherein the shape of the microconduit is selected from the group consisting of: smooth curve, curved coil, stove-top and stove-top coil.

15. The at least one microconduit of claim 1, wherein the freedom of movement of the flexible microconduit is constrained to inhibit entanglement with other flexible microconduits.

16. The microconduit of claim 1, wherein the substrate is selected from one or more of the group consisting of: silicon, silicon coated with a biocompatible polymer, polysilica, polymer, polyurethane, dielectric material, metal, photoresist, glass, and plastic laminate.

17. The microconduit of claim 1, wherein the microfluidic chip comprises a flip chip.

18. The microconduit of claim 1, wherein the substrate further comprises peripheral or area array pads.

19. The microconduit of claim 1, wherein the outer diameter of the microconduit is in the range of approximately 1 micron to approximately 10 microns.

20. The microconduit of claim 1, wherein the distal end further comprises at least one sensor for sensing a biological, chemical or electrical signal, wherein the microconduit tranmits the signal to the substrate for detection or analysis.

21. The microconduit of claim 1, wherein the biological environment is selected from the group consisting of: a human, an animal, a plant, tissues cultivated in macro- or micro-culture, and terrestrial, aquatic or atmospheric biological systems or processes.

22. A microsystem comprising:
a monolithic substrate having a front side and a back side;
one or more microconduits that are anchored at a proximal end with the monolithic substrate, having unanchored remaining length, wherein the microconduit is a coil that can stretch and contract and the free distal end is adapted for connection to a biological environment at a distal end;
the microconduit integrally manufactured on the monolithic substrate;
the microconduit comprises a fluid microconduit;
the microconduit is part of the electrical circuit on the monolithic substrate;
the monolithic substrate having fluidic elements etched in them and connected to the microconduit; and
a modular fluidic chip connectable to the monolithic substrate.

23. The microsystem of claim 22, wherein the modular chip is connectable to the substrate via a microclamp.

24. The microsystem of claim 23, wherein the microclamp is thermally actuated.

25. The microsystem of claim 24, wherein the microclamp comprises conductive doped polycrystalline silicon.

26. The microsystem of claim 23, wherein the microclamp further comprises an actuator.

27. The microsystem of claim 26, wherein the actuator comprises materials selected from the group consisting of: polymers, polysilicon, and metal, and combinations thereof.

28. The microsystem of claim 23, wherein the microclamp comprises a "3" spring.

29. The microsystem of claim 23, wherein the microclamp comprises an "anchor" spring.

30. The microsystem of claim 23, wherein the modular chip comprises a mating hole to accept the microclamp.

31. The microsystem of claim 22, wherein the modular chip is replaceable.

32. The microsystem of claim 22, wherein the modular chip is connectable to the front side or the back side of the substrate.

33. The microsystem of claim 22, wherein the modular chip is connectable to the substrate by a substantially liquid-leak-proof connection.

34. The microsystem of claim 22, wherein the substrate further comprises one or more holes in fluid connection with the microconduits, and wherein the modular chip further comprises one or more male connectors adapted for fluid connection to the holes.

35. The microsystem of claim 22, wherein the modular chip contains a drug.

36. The microsystem of claim 22, wherein the modular chip contains one, or therapeutic or putative therapeutic agents.

* * * * *